US007546331B2

(12) United States Patent
Islam

(10) Patent No.: US 7,546,331 B2
(45) Date of Patent: Jun. 9, 2009

(54) LOW POWER ARRAY MULTIPLIER

(75) Inventor: Farhad Fuad Islam, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 837 days.

(21) Appl. No.: 11/083,698

(22) Filed: Mar. 17, 2005

(65) Prior Publication Data

US 2006/0212505 A1    Sep. 21, 2006

(51) Int. Cl.
*G06F 7/53* (2006.01)
(52) U.S. Cl. ...................................... 708/627
(58) Field of Classification Search .................. 708/627
See application file for complete search history.

(56) References Cited

U.S. PATENT DOCUMENTS

| 5,787,029 | A  | * | 7/1998 | de Angel | 708/628 |
| 6,393,454 | B1 | * | 5/2002 | Chu | 708/630 |
| 6,604,120 | B1 | * | 8/2003 | De Angel | 708/631 |
| 6,721,774 | B1 | * | 4/2004 | Lee et al. | 708/629 |
| 2002/0032713 | A1 | * | 3/2002 | Jou et al. | 708/625 |
| 2002/0099751 | A1 | * | 7/2002 | Chen et al. | 708/620 |
| 2003/0120695 | A1 | * | 6/2003 | Willson et al. | 708/630 |

OTHER PUBLICATIONS

Switching Characteristics of Generalized Array Multiplier Architectures and their Applications to Low Power Design, Khurram Muhammad, Dinesh Somasekhar and Kaushik Roy, 1999 IEEE, pp. 230-235.

Reconfigurable Low Energy Multiplier for Multimedia System Design, Suhwan Kim and Marios C. Papaefthymiou, 2000 IEEE, pp. 129-134.
Multiplier Energy Reduction Through Bypassing of Partial Products, Jun-ni Ohban, Vasily G. Moshnyaga and Koji Inoue, 2002 IEEE, pp. 13-17.
The "Quiet" State—a new approach to low-power multiplier design, Nikos Mallios, Neil Burgess, 2003 IEEE, pp. 2222-2226.
International Search Report and Written Opinion-PCTUS2006/009706, International Search Authority- United States-03-17-069.
Nternational Preliminary Report on Patentability-PCT/US2006/009706, The International Bureau of WIPO, Geneva Switzerland-Sep. 27, 2007.

* cited by examiner

*Primary Examiner*—David H Malzahn
(74) *Attorney, Agent, or Firm*—Peter M. Kamarchik; Nicholas J. Pauley

(57) ABSTRACT

An array multiplier comprises a partial product array including a plurality of array elements and a final carry propagate adder. Operands smaller than a corresponding dimension of the partial product array are shifted toward the most significant row or column of the array to reduce the number of array elements used to compute the product of the operands. Switching activity in the unused array elements may be reduced by turning off power to the array elements or by padding the shifted operands with zeros in the least significant bits. Additional power saving may be achieved by having bypass lines in the partial product array that bypasses non-essential array elements and by feeding partial sum and carry directly to the final carry propagate adder. Elements of the carry propagate adder may also be bypassed to achieve further power reduction.

20 Claims, 24 Drawing Sheets

$$
\begin{array}{rcccccc}
 & a_{N-1} & \cdots & a_1 & a_0 \\
\times) & b_{M-1} & \cdots & b_1 & b_0 \\
\hline
 & a_{N-1}b_0 & \cdots & a_1b_0 & a_0b_0 \\
 & & \cdots & a_0b_1 & \\
 & a_{N-1}b_1 & \cdots & & \\
 & \cdots & & & \\
+) \; a_{N-1}b_{M-1} & \cdots & a_1b_{M-1} & a_0b_{M-1} & \\
\hline
\end{array}
$$

FIG. 1

LOW POWER ARRAY MULTIPLIER

BACKGROUND OF THE INVENTION

1. Field of the Invention

The present invention relates generally to arithmetic circuits for digital signal processors and more particularly to an array multiplier for computing the product of two operands.

2. Relevant Background

Portable electronic devices have become ubiquitous to modem life. Two relentless trends in portable electronic devices are increased functionality and decreased size. Increased functionality demands require increased computing capability—in particular, ever faster and more powerful processors. Decreased size requires decreasing the size of batteries used to power the processor and other electronics in the device. Therefore, manufacturers are faced with the seemingly contradictory goals of increasing computing capability, and hence power requirements, while at the same time decreasing battery size. While improvements in battery technology partially offset the problem, the decreasing size of batteries and demands for more computing capability impose a strict power budget on all portable electronic device electronics, and in particular on the processor.

The multiplier is a core component of many digital signal processors. The array multiplier is a popular architecture due to its relatively simple and regular structure. However, array multipliers have some drawbacks compared to other multiplier architectures, namely in terms of latency and power consumption. In array multipliers, results take time to propagate through the array. The propagation of the results through the array causes transistors in the array to switch multiple times before settling on final value. This switching activity is the primary cause of power dissipation in array multipliers.

SUMMARY OF THE DISCLOSURE

The present invention relates to an array multiplier with reduced latency and lower power consumption than conventional array multipliers. The array multiplier comprises a partial product array including a plurality of array elements arranged in rows and columns to compute and aggregate partial sums, and a carry propagate adder including a plurality of adder elements to generate the final result bits. For an N×M bit accurate multiplication, where N and M are the bit widths of the multiplicand and the multiplier respectively, the partial product array comprises N rows and M columns. However there are occasions where data with bit precisions lower than N or M needs to be processed by the same N×M bit multiplier. In such cases, the multiplicand and/or multiplier may be shifted so that not all of the array elements in the partial product array are used. The unused array elements are either turned off or prevented from switching resulting in lower power consumption.

In some embodiments, additional latency and power savings may be obtained by the addition of bypass lines in the partial product array to bypass unused array elements and/or adder elements that fall in the critical delay path. The internal bypass lines allow internal array elements to directly output result bits without the need of trickling the result bits down through unused array elements and/or adder elements in the critical delay path. In some embodiments, operands may be arbitrarily shifted any amount, i.e., shifted with 1-bit granularity. In these embodiments, the amount that an operand is shifted is dictated by the length of the operand. Maximum savings in latency and power are achieved when the MSB (most significant bit) of the operand is aligned with the most significant row or column of the partial product array. In other embodiments using fewer bypass lines, the amount that an operand is shifted depends on the location of the bypass granularity. In these embodiments, operands may be shifted to align a least significant bit of the operand with a predetermined row or column of the array. In any event, as long as the bit-precision of an operand is less than the maximum size of the array, a reduction in both power and latency is achieved by the disclosed techniques. Further reduction of power and latency requirements can be achieved if bypass lines are extended beyond the carry propagate adder.

BRIEF DESCRIPTION OF THE DRAWINGS

FIG. 1 is a graphical illustration in tabular form of the multiplication of two operands.

DESCRIPTION OF EMBODIMENTS OF THE INVENTION

FIG. 1 illustrates in tabular form an algorithm for multiplying an N-bit multiplicand, $a_N, a_{N-1}, \ldots a_1, a_0$ by an M-bit multiplier $b_M, b_{M-1}, \ldots b_1, b_0$. Both the N-bit multiplicand and the M-bit multiplier are binary numbers. The first step in the multiplication process is to form the partial products of the multiplicand and multiplier bits. Each bit of the multiplicand is multiplied by the first bit of the multiplier to form the first row of partial products, by the second bit of the multiplier to form the second row of partial products, by the third bit of the multiplier to form the third row of partial products, and so on until the final bit of the multiplier is reached. Each row of partial products after the first row is shifted relative to the previous row by one-bit position. The partial products in each column are then summed with carry to obtain the final product of the operands.

Figure 2:
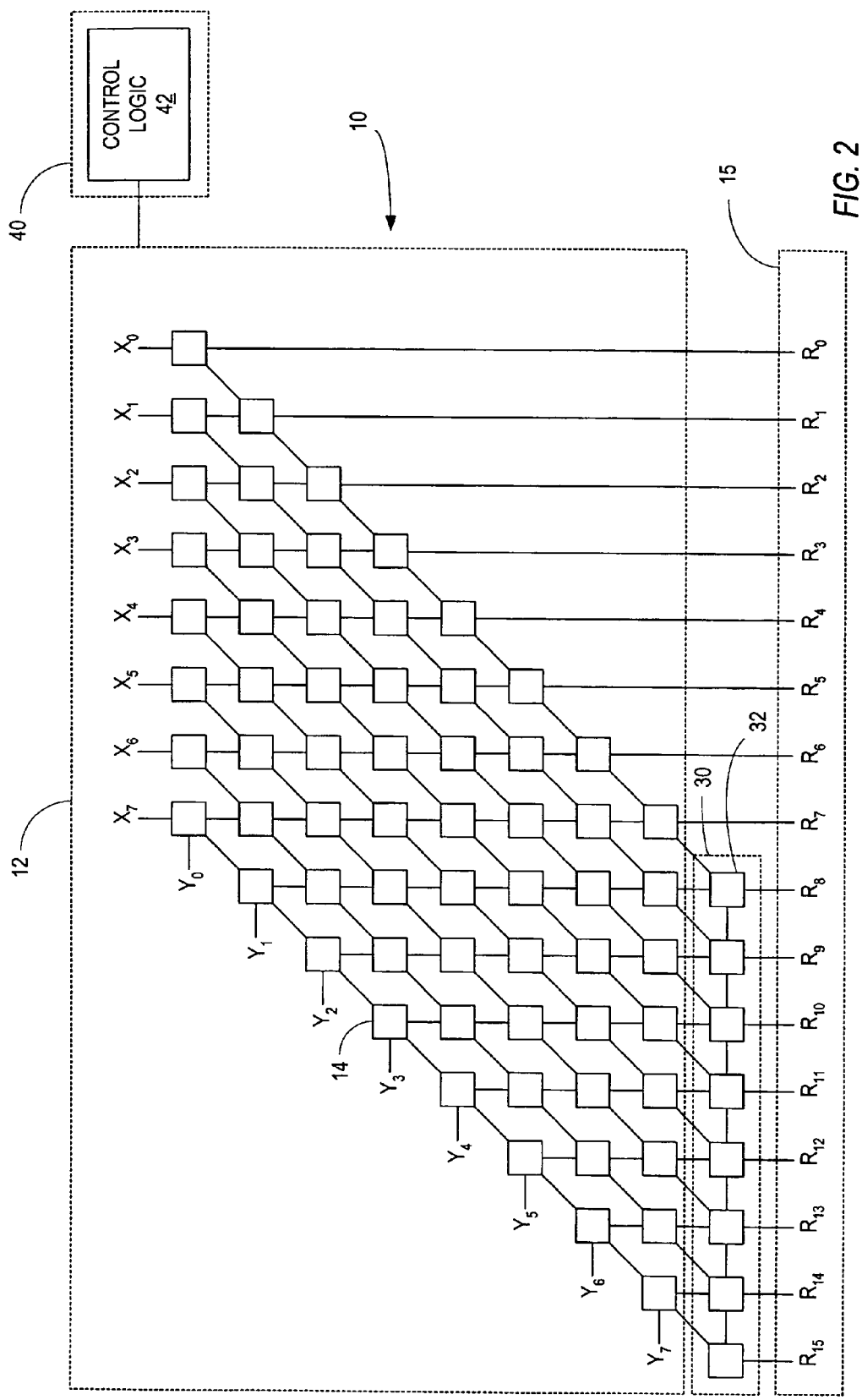
FIG. 2 is a graphical illustration of a first embodiment of an array multiplier for multiplying two operands.

FIG. 2 illustrates an exemplary array multiplier 10 implementing the multiplication algorithm of FIG. 1, where N=M=8. The array multiplier 10 comprises a partial product array 12 with N×M array elements 14, a carry propagate adder 30 with N adder elements 32, and associated control circuits 40. The partial product array 12 computes partial products of multiplicand and multiplier bits and progressively sums the partial products. The final partial sums and partial carries are output to the carry propagate adder 30, which propagates carries through the most significant bit (MSB) portion of the product. The result bits $R_{M+N}, \ldots, R_0, R_1$ of the final product are presented at the output 15 of the array multiplier 10. In the 8×8 example shown in FIG. 2, the first eight result bits are output directly by respective array elements 14 in the first column of the partial product array 12. The last eight bits are output by respective adder elements 32 of the carry propagate adder 30. Control circuits 40 prepare the operands, i.e., multiplicand and multiplier, and configures the partial product array 12 based on the length of the operands as will be described more fully below.

The partial product array 12 includes N×M array elements 14 arranged in N columns and M rows. In the following discussion, the indices i and j represent the columns and rows respectively of the partial product array 12, where i=0,1, . . . N−1 and j=0,1, . . . M−1. The columns are shown diagonally in FIG. 2 for purposes of illustration. Each array element 14 in the partial product array 12 computes a partial product of respective multiplicand and multiplier bits, and generates a partial sum and carry value. The partial sums for the array elements 14 in the first column (corresponding to the least significant bit of the multiplicand, where i=0) are output directly and form the result bits for the least significant portion of the final product. The partial sums for the array elements 14 in the last row (corresponding to the most significant bit of the multiplier, where j=M−1) are output to a corresponding adder element 32 in the carry propagate adder 30. The only exception being the array element 14 where the first column (i.e., i=0) and the last row (i.e., j=M−1) intersect. The array element 14 at i=0 and j=M−1 sends only carry output to the carry propagate adder 30 and its sum output forms a bit of the final product. All other array elements 14 output partial sums to a succeeding array element 14. The array elements 14 in the first M−1 rows output carry values to a succeeding array element 14 in the same column. The array elements 14 in the last row (corresponding to the most significant bit of the multiplier, where j=M−1) feed their carry outputs to a corresponding adder element 32 in the carry propagate adder 30.

Figure 3A:
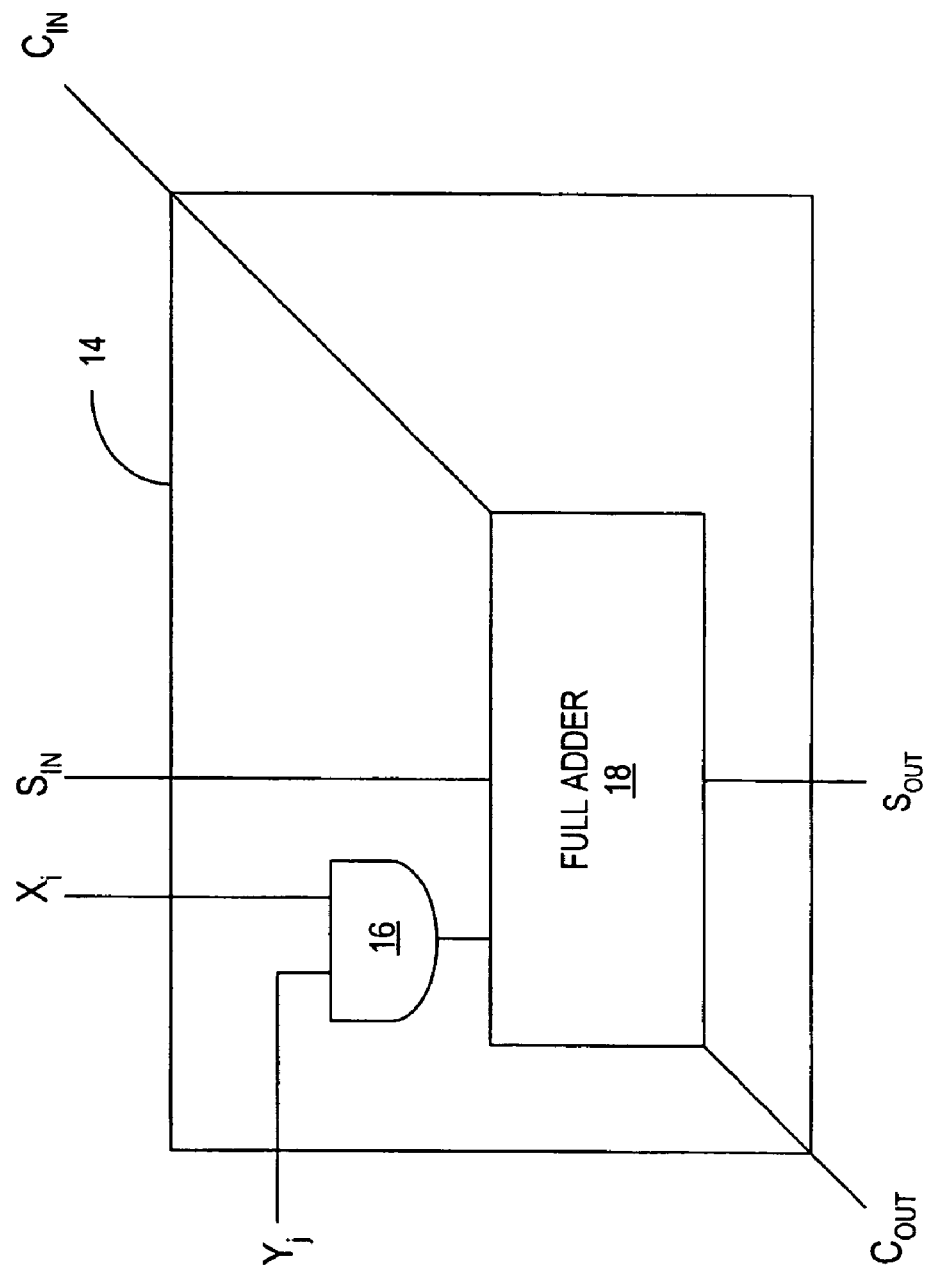
FIGS. 3A and 3B are graphical illustrations of array elements for the partial product array in the array multiplier of FIG. 2.
Figure 3B:
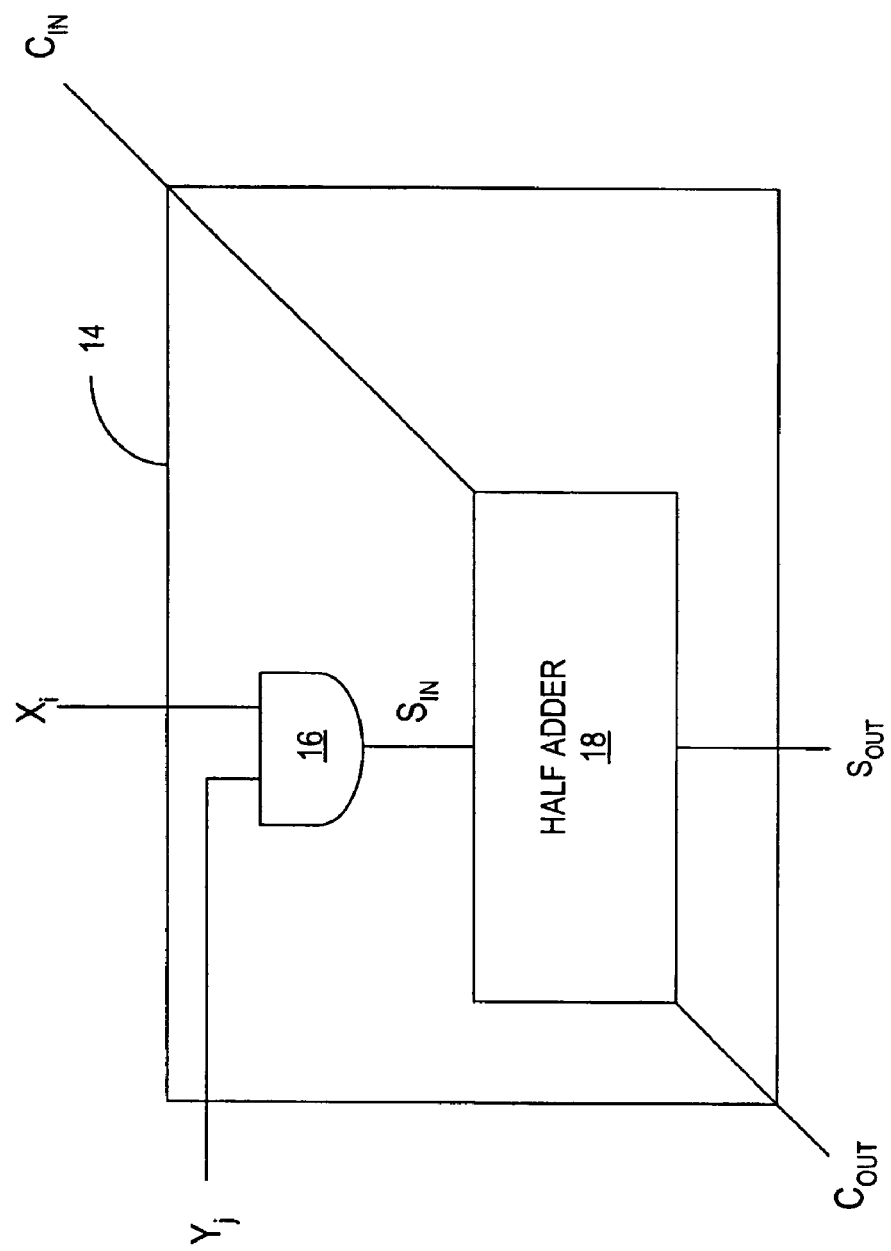

FIGS. 3A and 3B illustrate exemplary array elements 14 in more detail. FIG. 3A shows the general structure of an array element 14, which may be used at all positions of the partial product array 12. FIG. 3B illustrates a specialized form of an array element 14 that is adapted for specific positions in the partial product array 12 as will be hereinafter described.

The array element 14 shown in FIG. 3A includes an AND gate 16 and a full adder 18. AND gate 16 computes the partial product of a corresponding bit of the multiplicand $x_i$ and multiplier $y_j$. Adder 18 receives input values including the partial product $x_i \cdot y_j$ from the AND gate 16, a sum input $S_{IN}$, and a carry input $C_{IN}$, and computes output values including a partial sum $S_{OUT}$ and carry value $C_{OUT}$. For the array elements 14 in the first row (corresponding to the least significant bit of the multiplier where j=0) and last column (corresponding to the most significant bit of the multiplicand where i=N−1) of the partial product array 12, the sum input $S_{IN}$ is zero. Each of these array elements 14 can have a half adder instead of the full adder 18 as shown in FIG. 3B. For all other array elements 14, the sum input $S_{IN}$ is provided by a preceding array element 14 in the i+1$^{th}$ column and j−1$^{th}$ row of the partial product array 12. The carry input for the array elements 14 in the first row is zero. For all other array elements 14, the carry input is provided by a preceding array element 14 in the same column, previous row.

Figure 3C:
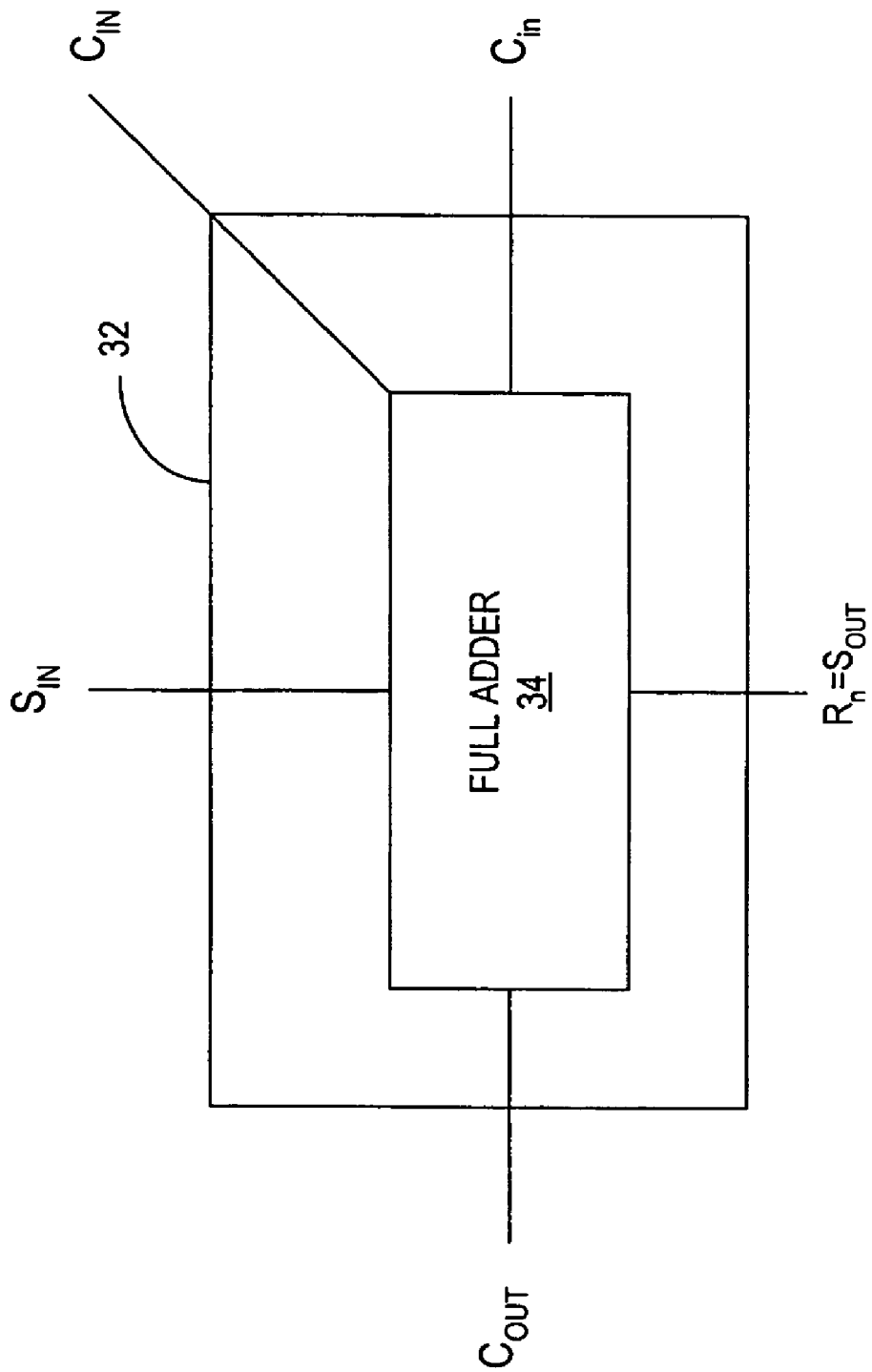
FIGS. 3C, 3D and 3E is a graphical illustration of adder elements for the carry propagate adder in the array multiplier of FIG. 2.
Figure 3D:
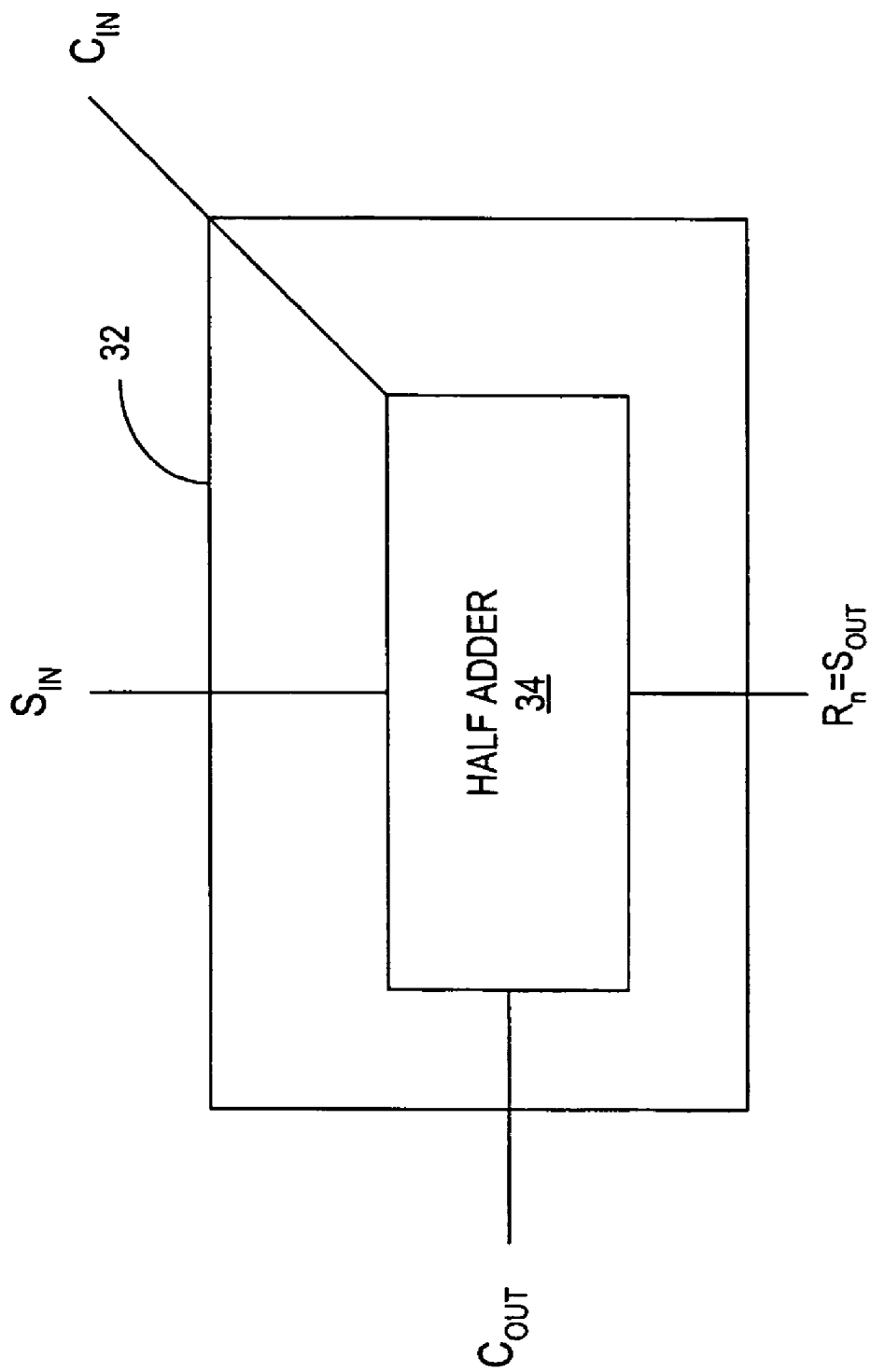
Figure 3E:
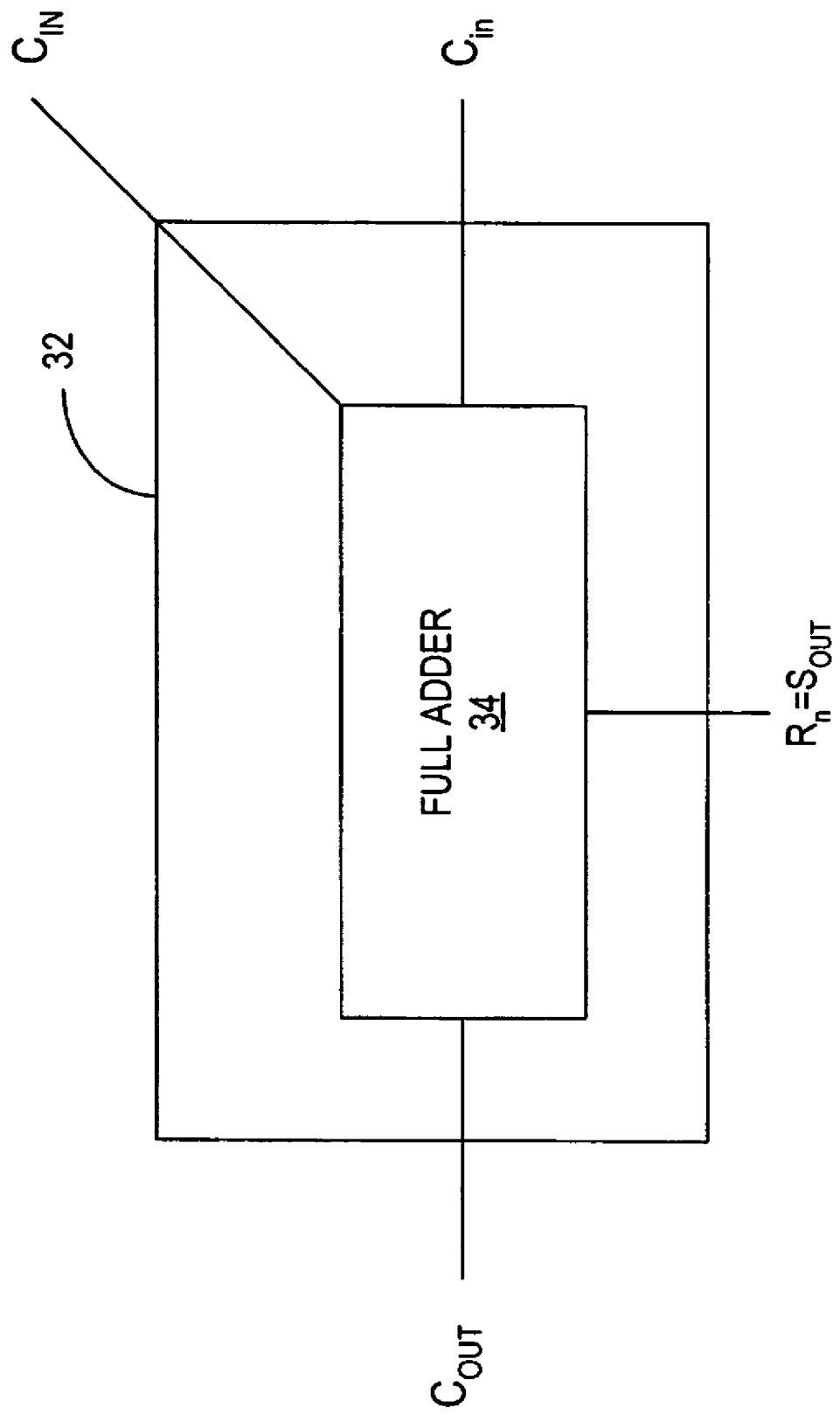

The carry propagate adder 30 comprises a linear array of N adder elements 32 as shown in FIGS. 3C-3E. FIG. 3C shows the general structure of an adder element 32, which may be used at all positions of the carry propagate adder 30. FIGS. 3D and 3E illustrates specialized forms of the adder element 32 that are adapted for specific positions in the partial product array 12 as will be hereinafter described.

The adder element 32 shown in FIG. 3C includes a full adder 34 that receives a sum input $S_{IN}$, and two carry inputs, $C_{IN}$ and $C_{in}$, and generates sum and carry outputs $S_{OUT}$ and $C_{OUT}$. The sum input $S_{IN}$ and carry input $C_{IN}$ are supplied by the partial product array 12, whereas $C_{in}$ comes from adjacent adder element 32 on the LSB side. The first adder element 32 at the LSB end of the carry propagate adder 30 will have $C_{in}$=0, or a half adder may be used instead of a full adder 34 as shown in FIG. 3D. The last adder element 32 will have $S_{IN}$=0, or a half adder may be used instead of the full adder shown in FIG. 3E. The sum input $S_{IN}$ for all but the last adder element 32 comes from array element 14 corresponding to the last row, where j=M−1 and i≠N−1. The carry propagate adder 30 propagates carries through the most significant portion of the final product of the operands. The least significant portion of the final product is generated from the sum outputs of the array elements 14 of the first column, where i=0.

The control circuit 40 comprises control logic 42, which may be implemented in hardware, firmware, or software. Control logic 42 configures the partial product array 12 and determines how operands are input to the partial product array 12. Operands having a length less than the maximum width of the partial product array may be shifted one or more positions. As described in more detail below, control logic 42 determines the displacement of the operands, or how many positions the operands are shifted, when input to the partial product array 12.

In operation, the bits of the multiplicand are supplied to array elements 14 in respective columns of the partial product array 12 and the bits of the multiplier are supplied to array elements 14 in respective rows of the partial product array 12. The computation of partial sums in the partial product array 12 propagates one row at a time through the partial product array 12. Array elements 14 in each row of the partial product array 12 after the first row must use the results from the array elements 14 in the previous row to complete computations. Consequently, some array elements 14 of the partial product array 12 will change state numerous times before settling on a final value.

First Embodiment

Figure 4:
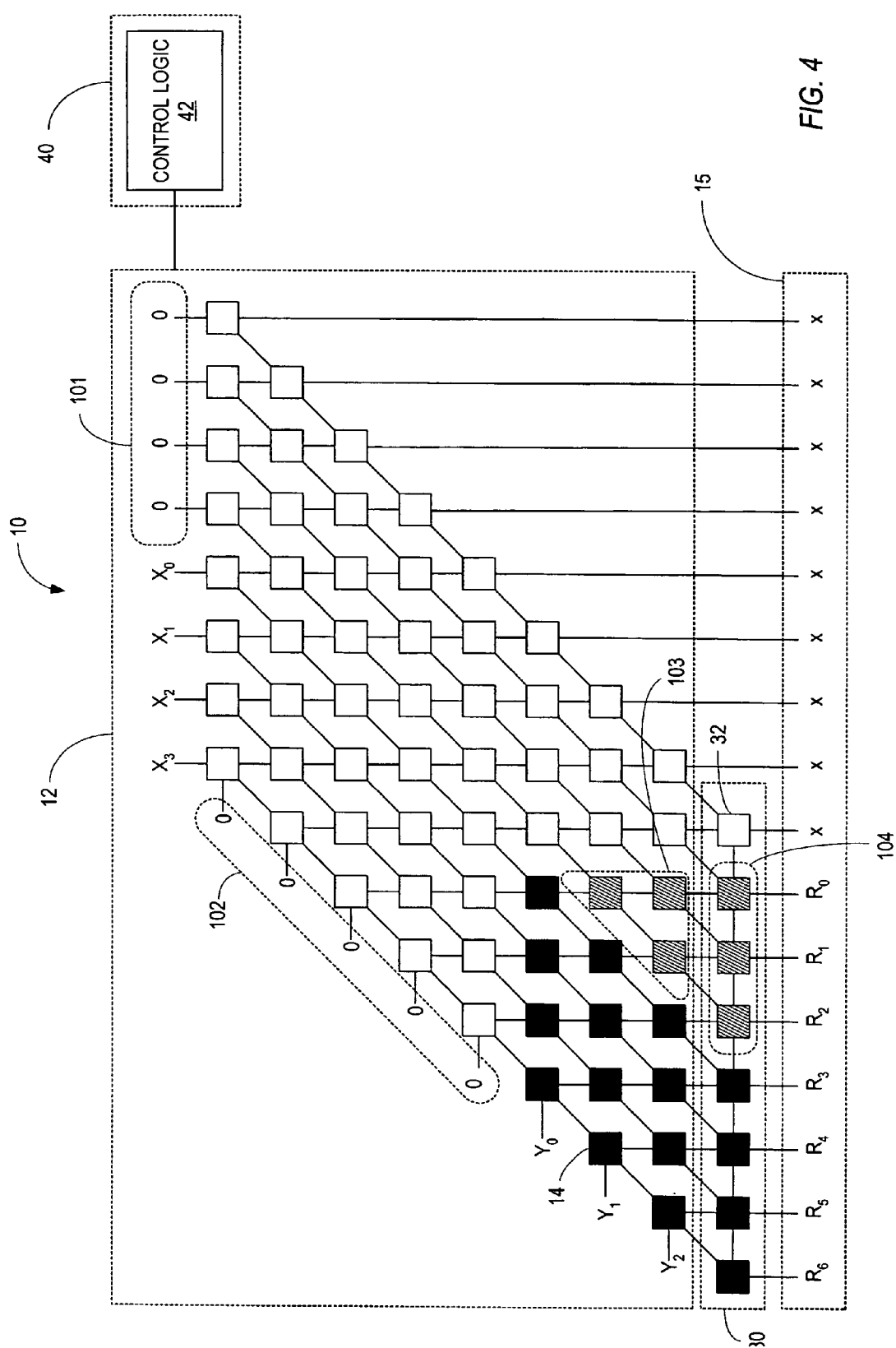
FIG. 4 is a graphical illustration of the array multiplier of FIG. 2 performing a 4×3 multiplication operation.

FIG. 4 illustrates one exemplary method for reducing power dissipated by the array multiplier 10 when the length of one or both operands is less than the maximum length of the partial product array 12. FIG. 4 illustrates multiplication of a 4-bit multiplicand by a 3-bit multiplier using an 8×8 array multiplier 10. As shown in FIG. 4, both the multiplicand and multiplier are input to the partial product array 12 in a shifted position. That is, the operands are shifted towards the most significant column or row of the partial product array 12. In the embodiment shown in FIG. 4, the operands are shifted to align the most significant bit of the operands with the most significant column and row respectively of the partial product array 12. Shifting the operands towards the most significant bit position of the partial product array 12 reduces the number of array elements 14 needed to compute the product of the operands. The array elements 14 and adder elements 32 needed for the computation are illustrated as solid black squares in FIG. 4. Unused array elements 14 and adder elements 32 are illustrated as white squares. The array elements 14 and adder elements 32 shaded with diagonal lines are not strictly necessary to the multiplication of operands that have bit width (=4 in this example) less than the maximum size (=8 in this example) of the partial product array 12. The result bits $R_6, \ldots, R_0, R_1$ of the final product are presented at the output 15 of the array multiplier 10. In the 4×3 example shown in FIG. 4, the partial sums output by the array elements 14 corresponding to $X_0, Y_0, X_0, Y_1$ and $X_0, Y_2$ represent the three LSBs of the result. However, the partial sums of these array elements 14 must trickle down through the shaded array elements 14 (denoted by reference numeral 103) and adder elements 32 (denoted by reference numeral 104) to reach the output 15.

Various measures may be taken to reduce switching activity in the unused elements 14 outside the critical delay path (those shown as white squares) of the partial product array 12. To reduce power consumption in the unused array elements 14 outside the critical delay path, the control circuit 40 could simply turn off power to the unused array elements 14 in the partial product array 12. Alternatively, control circuit 40 may pad the operands with zeros (denoted by reference numerals 101 and 102 for the multiplicand and multiplier respectively) in the least significant bit positions as shown in FIG. 4 to reduce switching activity in the unused array elements 14 of the partial product array 12. Note that, when a continuous string of zeros appear in the least significant bit positions of the input multiplicand and multiplier, the array elements 14 in the columns and rows corresponding to the zeros do not change state and, consequently, use less power.

In the embodiment shown in FIG. 4, the shaded array elements 14 and adder elements 32 cannot be turned off even though these elements are not needed for the computation because the results must trickle down to the output 15. In subsequent embodiments described below, techniques will be described to reduce power consumption in the non-essential array elements 14 denoted by reference numeral 103 and adder elements 32 denoted by reference numeral 104.

The control circuit 40 determines how much to shift the operands based on the length of the operands. In the example given above, the operands are shifted such that the most significant bits of the operands are aligned with the most significant column and row of the partial product array 12. In the example given above, the 4-bit multiplicand is padded with four zeros 101 in the first four bit positions to yield an 8-bit input word containing the shifted multiplicand. The control logic 42 pads the 3-bit multiplier with 5 zeros 102 in the first five bit positions to yield a second 8-bit input word containing the shifted multiplier.

Assuming each array element 14 and adder element 32 has a delay of T, the total time needed to compute the product of two numbers in an $N_{MAX} \times M_{MAX}$ multiplier is $N_{MAX} \times T + M_{MAX} \times T$. For an 8×8 multiplier, the delay or latency is 16T. Thus, in a conventional multiplier, the delay remains the same regardless of the length of the operands. However, in the array multiplier shown in FIGS. 2-4, the delay varies depending on the length of the operands. For example, in the case of the 4×3 multiplication illustrated in FIG. 4, the total delay is (4+3)×T or 7T, a savings of 11T over a conventional 8×8 multiplier. Thus, there is a corresponding reduction in time (latency) needed to compute the product of two operands as the size of the operands decreases.

Second Embodiment

Figure 5:
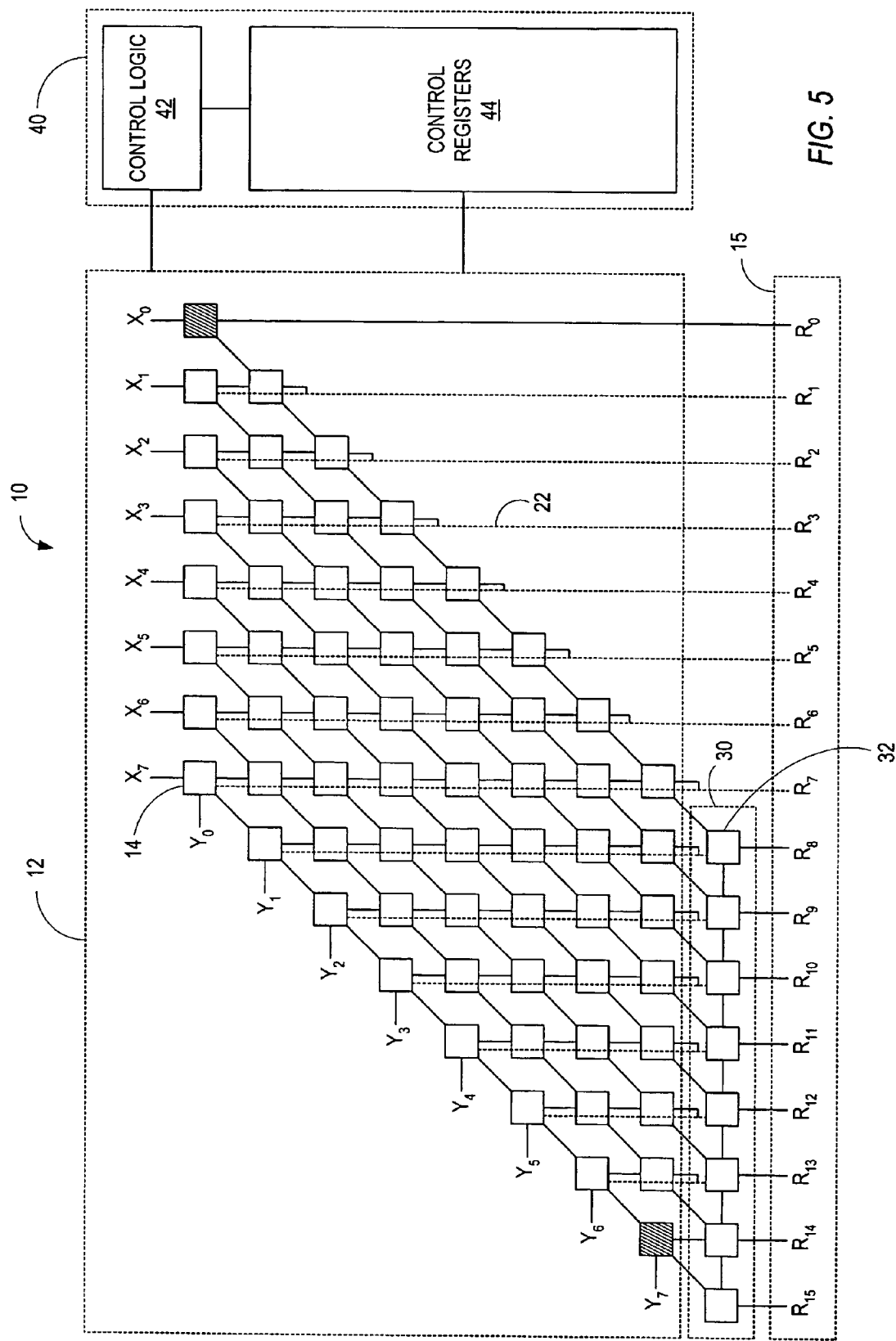
FIG. 5 is a graphical illustration of a second embodiment of the array multiplier with bypass lines providing one-bit bypass granularity.
Figure 6A:
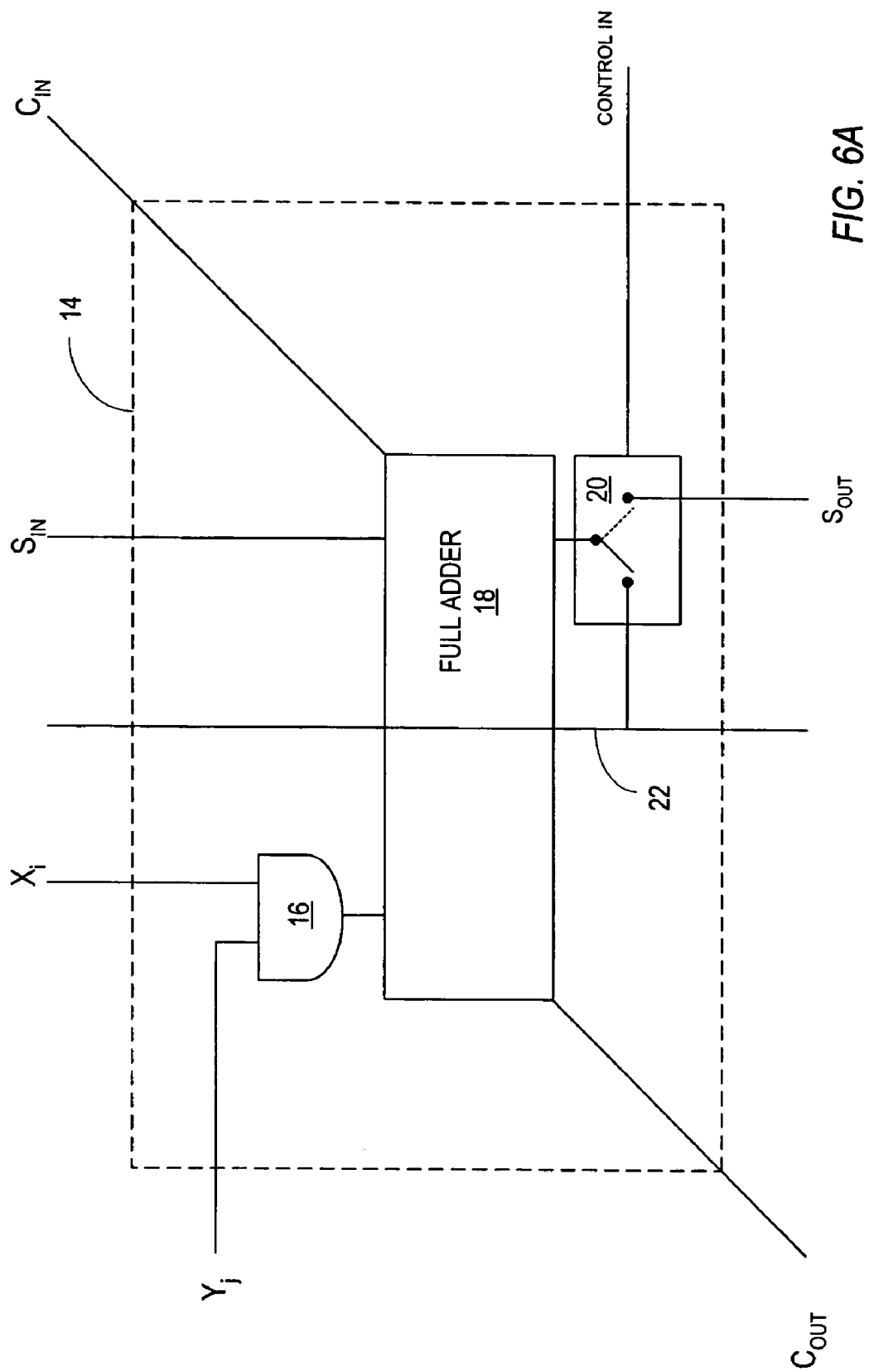
FIGS. 6A and 6B are graphical illustrations of array elements for the partial product array in the array multiplier of FIG. 5.
Figure 6B:
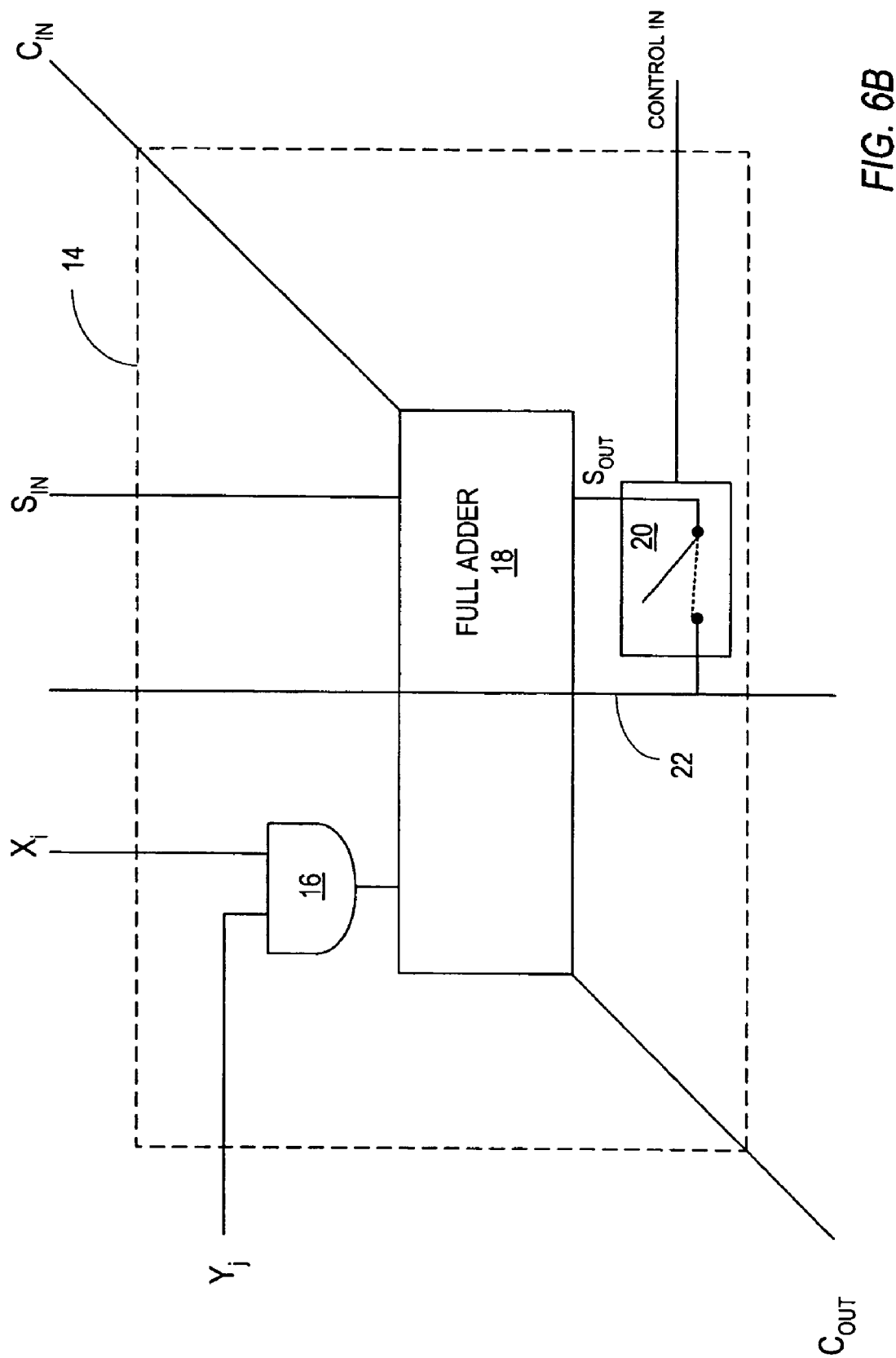
Figure 7:
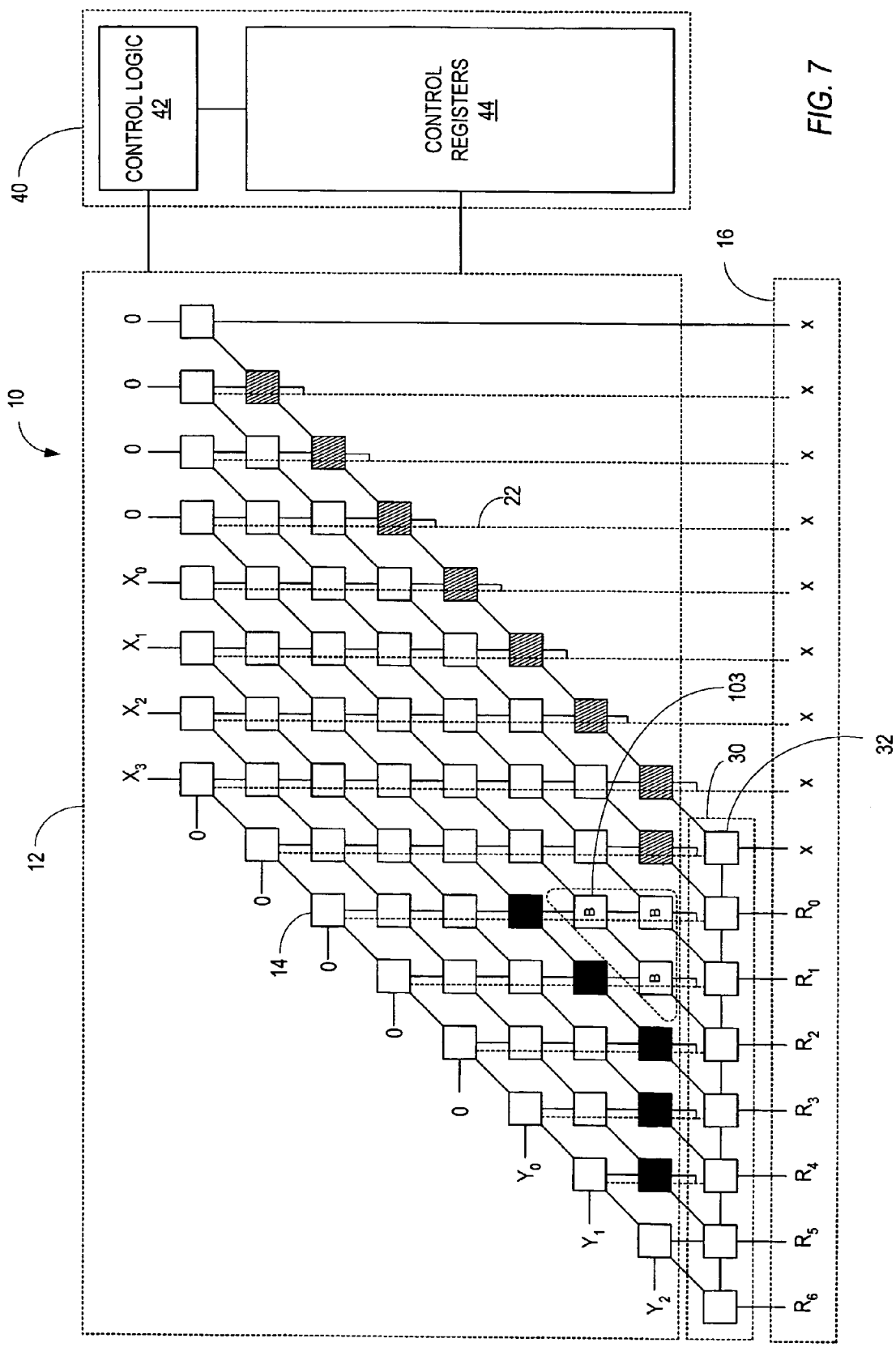
FIG. 7 is a graphical illustration of the array multiplier of FIG. 5 configured to perform a 4×3 multiplication operation.

FIGS. 5-7 illustrate a second exemplary embodiment of the array multiplier 10. The second embodiment is similar to the first embodiment shown in FIGS. 2-4. Therefore, for the sake of brevity and clarity, the same reference numerals will be used to designate similar components in the two embodiments and the discussion below will focus on aspects where the second embodiment differs from the first.

The array multiplier 10 according to the second embodiment comprises a partial product array 12 including a plurality of array elements 14 arranged in columns and rows, a carry propagate adder 30 including a linear array of adder elements 32, and a control circuit 40. The array elements 14 in the partial product array 12 and the adder elements 32 in the carry propagate adder 30 are interconnected as previously described with the following differences. In the second embodiment of the array multiplier 10, the partial product array 12 includes bypass lines 22 connecting array elements 14 in a vertical column (as distinguished from diagonal columns previously described) to the sum input $S_{IN}$ of corresponding adder elements 32 of the carry propagate adder 30. The sum outputs from array elements 14 in the last row of the partial product array 12 connect to the bypass line 22 instead of the carry propagate adder 30. The bypass lines 22 allow internal array elements 14 to output a partial sum directly to the carry propagate adder 30, bypassing non-essential array elements 14. It should be noted that the array elements 14 in the MSB corner and LSB corner of the partial product array 12 denoted by diagonal lines do not connect to a bypass line 22 because these array elements 14 do not have any other array elements 14 in line with them.

FIGS. 6A and 6B illustrate exemplary array elements 14 for the second embodiment in more detail. FIG. 6A illustrates the general structure of the array element 14 for the second embodiment. FIG. 6B illustrates a specialized form of the array element 14 for array elements 14 in the last row and first column of the partial product array 12. In the generalized form shown in FIG. 6A, each array element 14 includes an AND gate 16 and a full adder 18 as previously described. In addition, the array elements include a bypass circuit 20. The AND gate 16 computes the partial product of a corresponding bit of the multiplicand $x_i$ and multiplier $y_j$. The adder 18 receives input values including the partial product $x_i \cdot y_j$ from the AND gate 16, a sum input $S_{IN}$, and a carry input $C_{IN}$, and computes a partial sum and carry value. The bypass circuit 20 selectively connects the partial sum output by the adder 18 either to a sum output $S_{OUT}$ or to the bypass line 22. For the last array element 14 along each vertical bypass line 22, the bypass circuit 20 selectively connects the partial sum output by the adder 18 to the bypass line 22 as shown in FIG. 6B. Note, in the embodiment shown in FIG. 5, there is no sum output $S_{OUT}$ in the specialized array element 14 in FIG. 6B. As a result, the product of the operands may be fetched from the partial product array 12 at a time dependent on the bit width of the operands, which reduces latency associated with the multiplication operation.

When the operands are shifted as shown in FIG. 4, in order to reduce switching activity and latency, it is desirable to output the results from one or more selected internal array elements 14 to the carry propagate adder 30 and bypass any intervening non-essential array elements shown by shaded squares in FIG. 4 and denoted by reference numeral 103. In the embodiment shown in FIG. 5, the sum output of essential array elements 14 are connected to the bypass line 22 by the bypass circuit 20 responsive to a control signal from the control circuit 40 and all non-essential array elements 14 are disconnected. In general, only one array element 14 in each vertical line of array elements 14 is connected to the bypass line 22 at any given time.

FIG. 7 illustrates the connection state of various array elements 14 with the vertical bypass line 22 for the same 4×3 multiplication operation shown in FIG. 4. The solid black array elements 14 in FIG. 7 represent array elements 14 that are connected to the bypass lines 22 for a 4×3 multiplication operation. Non-essential array elements 14 that are bypassed for power saving are identified in FIG. 7 by the letter B and denoted collectively by reference numeral 103. The array elements 14 shown with diagonal lines may be connected even though the results are not used in for the computation in order to provide an acceptable voltage level at the output. Alternatively, the unused array elements 14 shown with diagonal lines can be disconnected from the bypass line 22 and the bypass lines 22 may be pulled to ground. Note that the embodiment in FIG. 7 has additional power saving with respect to that in FIG. 4 due to the additional bypassing of non-essential array elements 103.

In the embodiment shown in FIG. 7, the control circuit 40, in addition to preparing the operands, configures the partial product array 12 using the control registers 44. In one embodiment, each array element 14 connecting to a bypass line 22 has a corresponding single-bit control register 44. The control logic 42 determines which array elements 14 should connect to the bypass lines 22 and enables the bypass circuit 20 for the selected array elements 14 by writing a "1" to the corresponding control register 44. A "0" in the control register 44 disconnects the array element 14 from the bypass line 22. Thus, the bypass circuit 20 selectively connects and disconnects the sum output to the bypass line 22 depending on the bit in the control register 44. The result bits $R_6, \ldots, R_0, R_1$ of the final product are generated at the output 15 of the array multiplier 10.

Third Embodiment

The array multiplier 10 shown in FIGS. 5-7 allows operands to be shifted with one-bit granularity. The one-bit granularity allows operands of any size to be shifted completely to align the most significant bits of the operands with the most significant column and row respectively of the partial product array. The bypass lines 22, however, may introduce parasitic capacitance into the partial product array 12. Therefore, it may not be desirable to reduce the number and length of the bypass lines 22.

Figure 8:
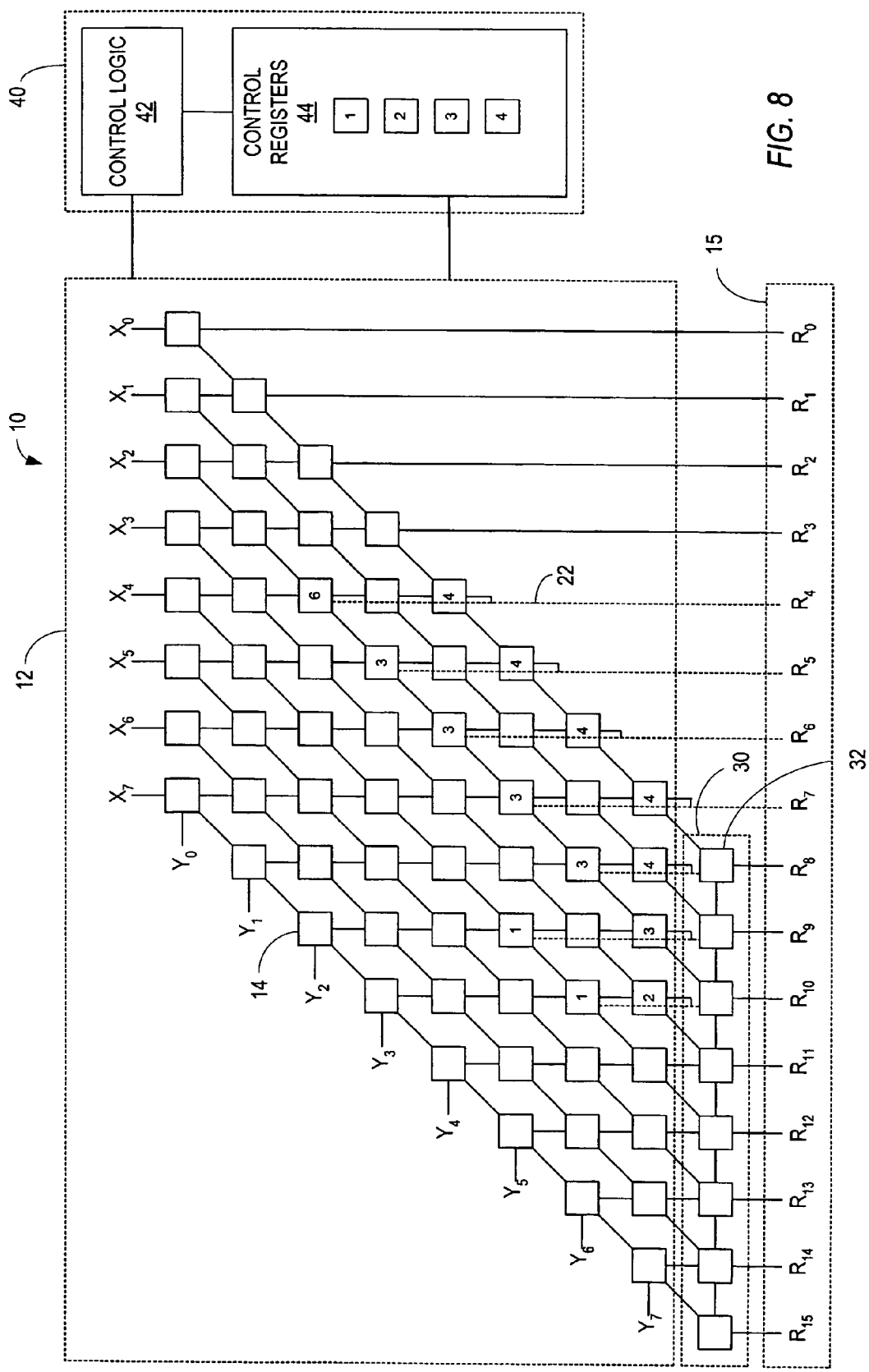
FIG. 8 is a graphical illustration of a third embodiment of the array multiplier with bypass lines providing coarse bypass granularity.

FIG. 8 illustrates another embodiment of the array multiplier 10 that uses fewer bypass lines 22 and thus reduces parasitic capacitance, but which has a coarser granularity. Array multiplier 10 comprises a partial product array 12 including a plurality of array elements 14, a carry propagate adder 30 including a linear array of adder elements 32, and a control circuit 40 as previously described. The control circuit 40 includes control logic 42 and control register 44 that operate as previously described. In this embodiment, there are four control registers, numbered 1-4 for reference. The partial product array 12 includes bypass lines 22 connecting selected array elements 14 of the partial product array 12 to the carry propagate adder 30. The array elements 14 connected to the bypass lines 22 are numbered to indicate the corresponding control register 44 that controls the array element 14.

Figure 9:
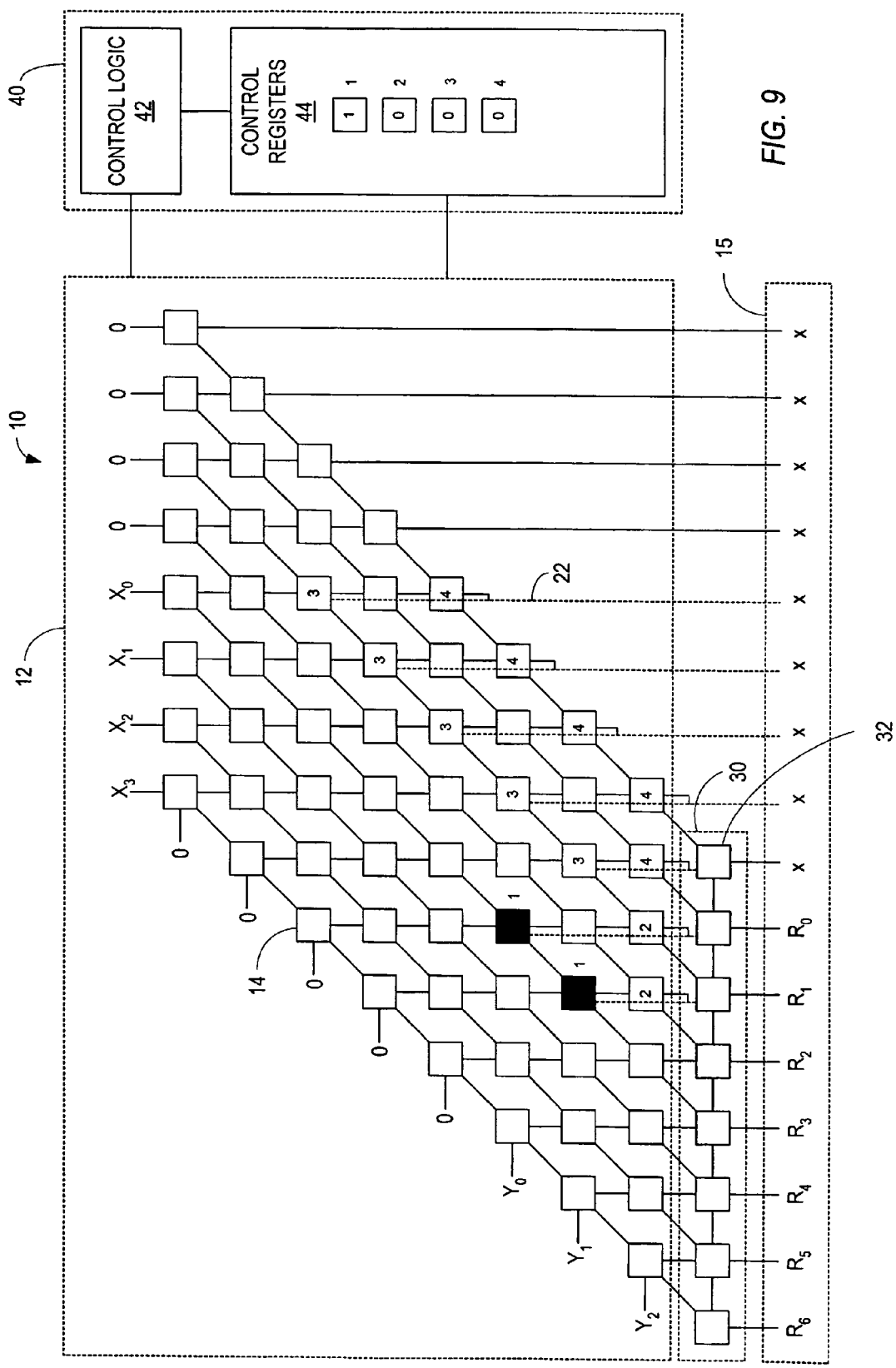
FIG. 9 is a graphical illustration of the third embodiment of the array multiplier configured to perform a 4×3 multiplication operation.
Figure 10:
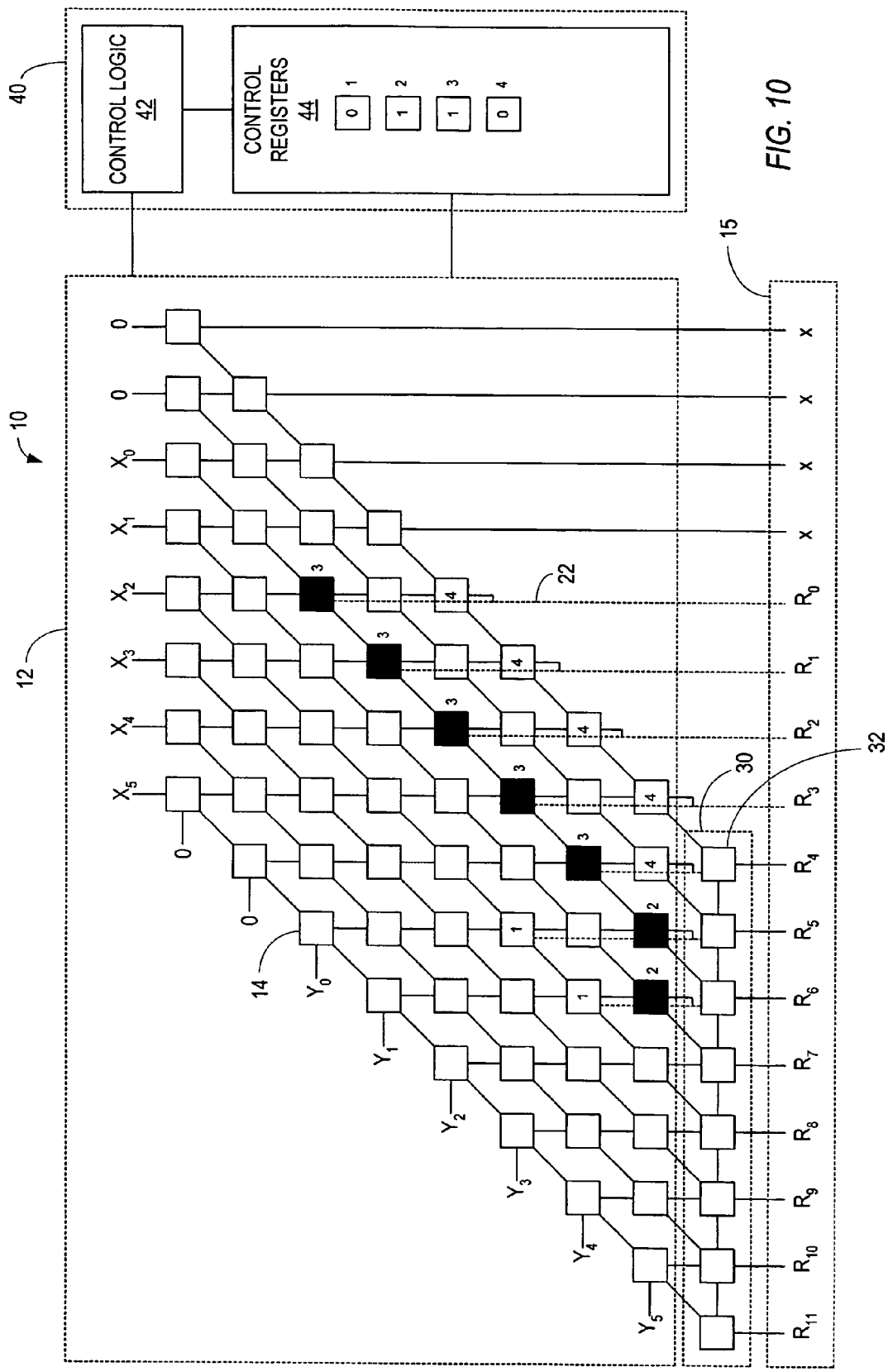
FIG. 10 is a graphical illustration of the third embodiment of the array multiplier configured to perform a 6×6 multiplication operation.
Figure 11:
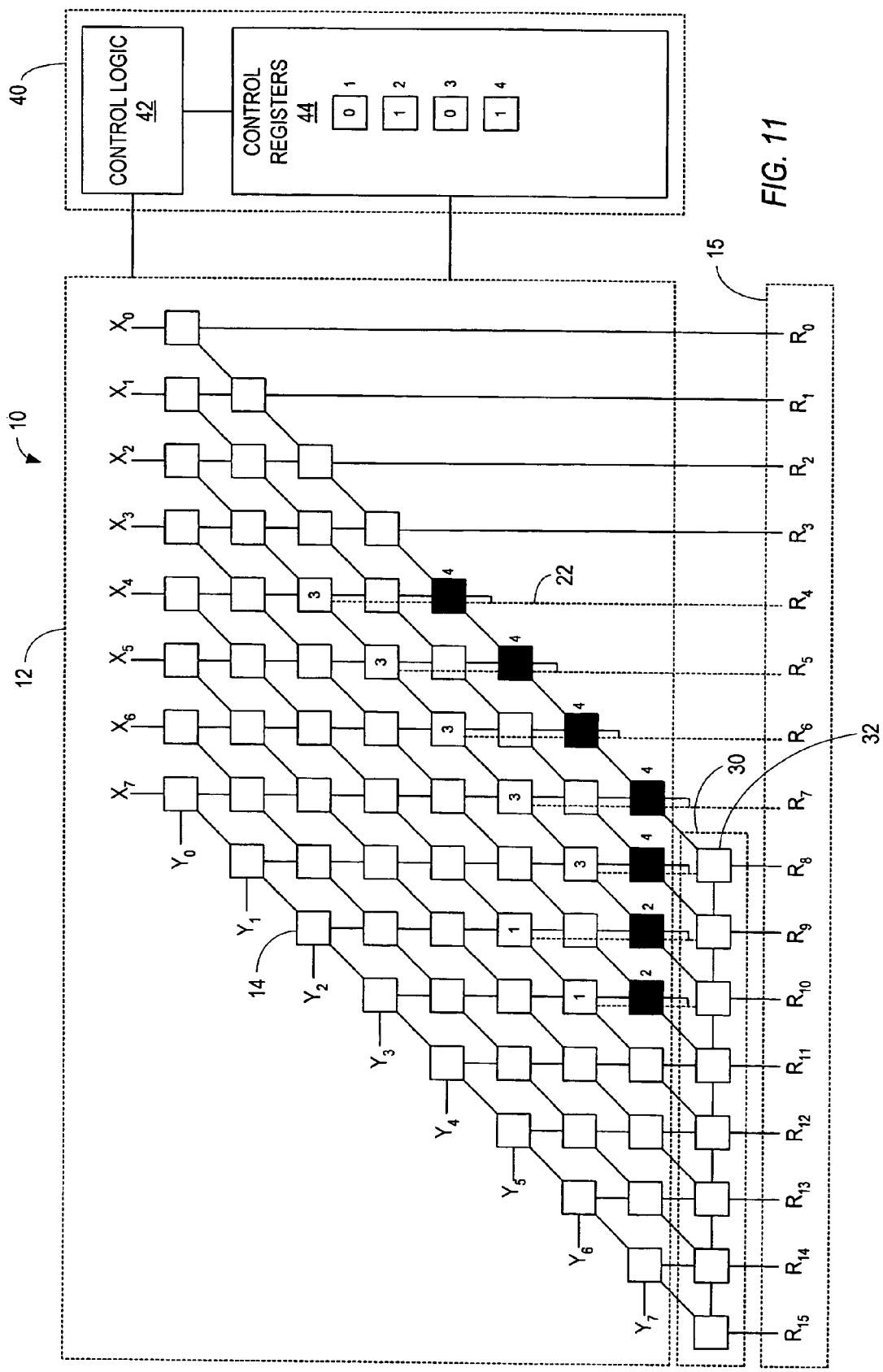
FIG. 11 is a graphical illustration of the third embodiment of the array multiplier configured to perform an 8×8 multiplication operation.

The array multiplier 10 shown in FIG. 8 has three levels of granularity or operating modes, denoted as the 4×3 mode, 6×6 mode, and 8×8 mode. In 4×3 operating mode, the array multiplier 10 can multiply operands of 4 bits in length for the multiplicand and 3 bits in length for the multiplier. In 6×6 operating mode, the array multiplier 10 can multiply operands of 6 bits in length for the multiplicand and 6 bits in length for the multiplier. In 8×8 operating mode, the array multiplier 10 can multiply operands of 8 bits in length for the multiplicand and 8 bits in length for the multiplier. Control logic 42 configures the control registers and pads the operands in the three operating modes as shown in FIGS. 9-11. FIG. 9 illustrates the 4×3 mode, FIG. 10 illustrates the 6×6 mode, and FIG. 11 illustrates the 8×8 mode. In FIGS. 9-11 array elements 14 shown in black are connected to the bypass lines 22. In general, the control logic 42 selects the operating mode that minimizes the number of array elements 14 being used. For example, to perform multiplication of a 5-bit multiplicand by a 4-bit multiplier, control logic 42 selects the 6×6 operating mode. For the 4×3 and 6×6 modes, the multiplier and the multiplicand have to be shifted toward the MSB and the LSB positions as shown in FIGS. 9 and 10.

Figure 12:
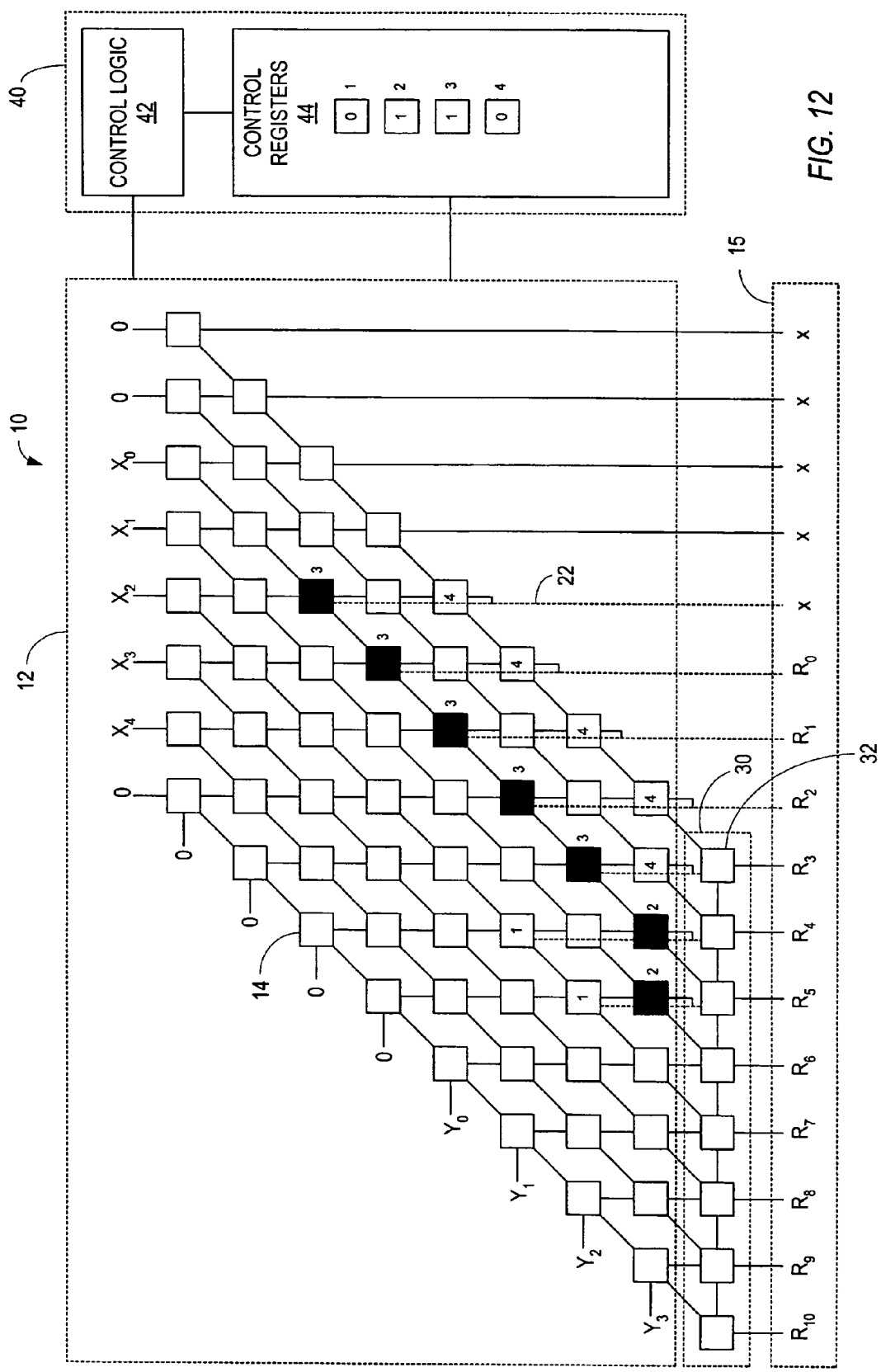
FIG. 12 is a graphical illustration of the third embodiment of the array multiplier configured to perform a 5×4 multiplication.

FIG. 12 illustrates how the third embodiment of the array multiplier 10 may be used to perform a 5×4 multiplication operation. For this multiplication, the 6×6 mode is selected by the control circuit 40. The multiplicand is shifted two bit positions to align the LSB of the multiplicand with the third column (i=2) of the partial product array 12. The multiplier, in contrast, is shifted four bit positions to align the MSB of the multiplier with the MSB row of the partial product array 12. Note that the multiplier could be shifted only three bit positions to align the LSB of the multiplier with the LSB fourth row of the partial product array 12. However, the later approach would mean that partial sums would have to trickle down through the last row, even though the last row does not contribute to the computation. Thus, the third embodiment allows shifting of the multiplier with one-bit granularity, but only coarse granularity shifting for the multiplicand. The offsetting benefit is fewer bypass lines, fewer control registers, and less parasitic capacitance.

Fourth Embodiment

Figure 13:
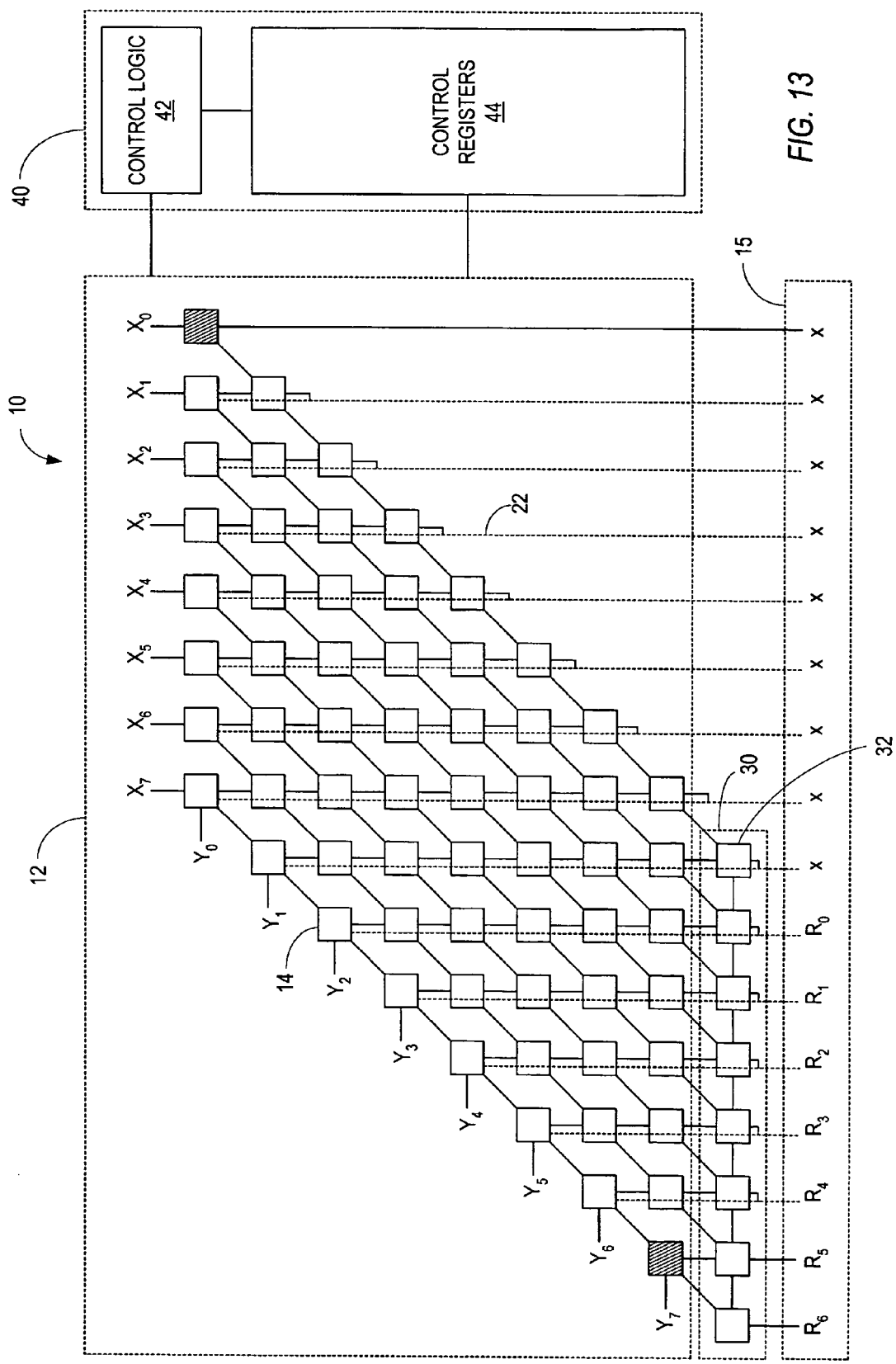
FIG. 13 is a graphical illustration of a fourth embodiment of the array multiplier with bypass lines extended to encompass carry propagate adder elements.
Figure 14:
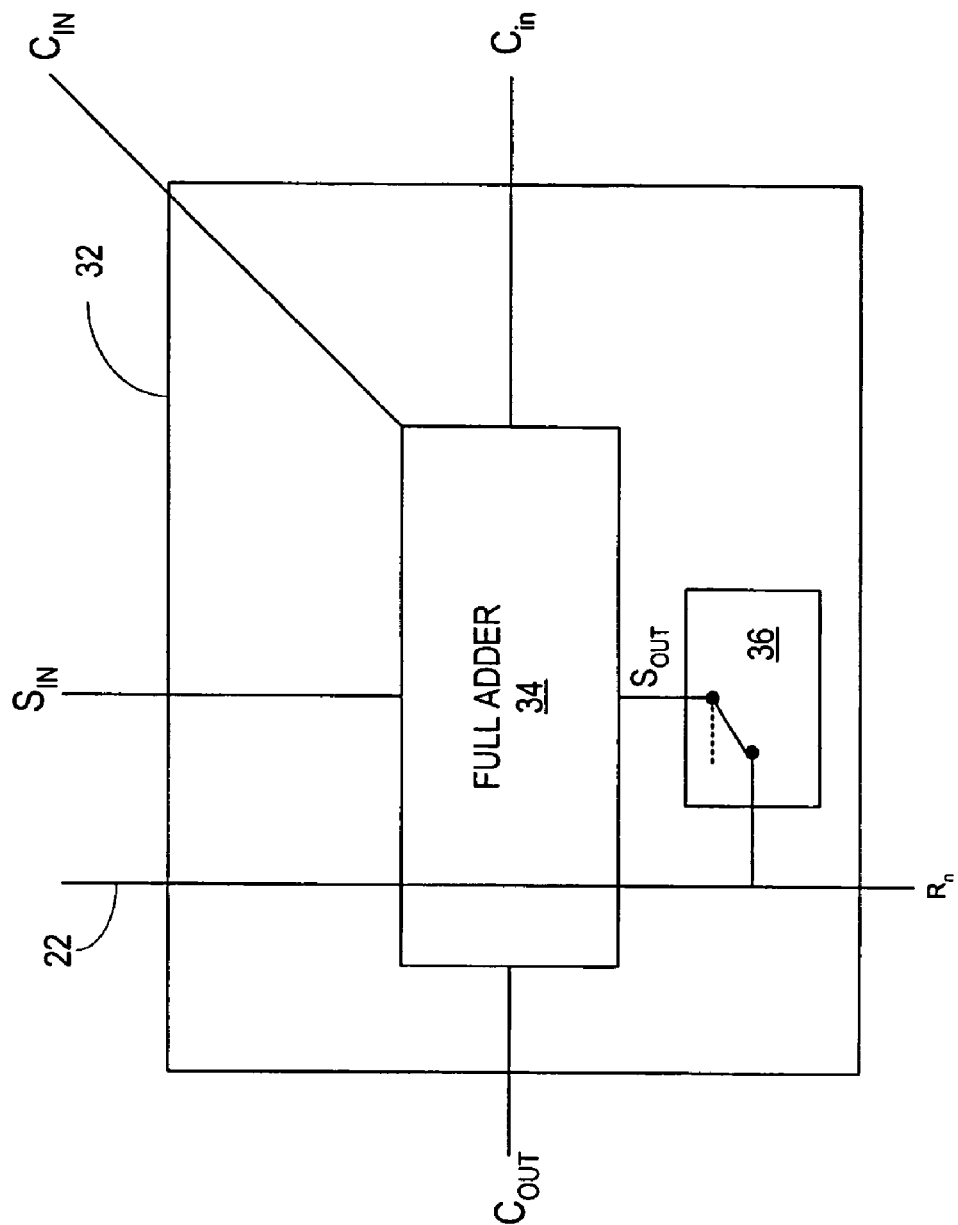
FIG. 14 is a graphical illustration of a carry propagate adder element enhanced with bypass circuit.

In the first three embodiments, only non-essential elements of the partial product array 12 have been bypassed to reduce power consumption. However, the vertical bypass lines 22 shown in FIG. 5 can be extended beyond the carry propagate adder 30, so that non-essential adder elements 32 of the carry propagate adder 30 can also be bypassed. The structure of the partial product array 12 and carry propagate adder 30 are the same as the second embodiment except that the bypass lines extend beyond the carry propagate adder 30 and connect directly to the output 15 of the array multiplier 10. In the fourth embodiment, shown in FIG. 13, array elements 14 in the last row are constructed as shown in FIG. 6A and the sum outputs for the array elements 14 in the last row are connected to the sum input of respective adder elements 32 in the carry propagate adder 30. The carry propagate adder 30 in FIG. 13 has modified adder elements 32 as shown in FIG. 14. FIG. 14 illustrates the general structure of the adder element 32 including a full adder 34 and bypass switch 36. The first and last adder elements may use half adders as previously described. When the adder 34 in element 32 needs to be bypassed, the bypass switch 36 is opened to disconnect the adder element 32 from the bypass line 22. The bypass switch 36 is closed when adder element 32 has to be used for addition.

Figure 15:
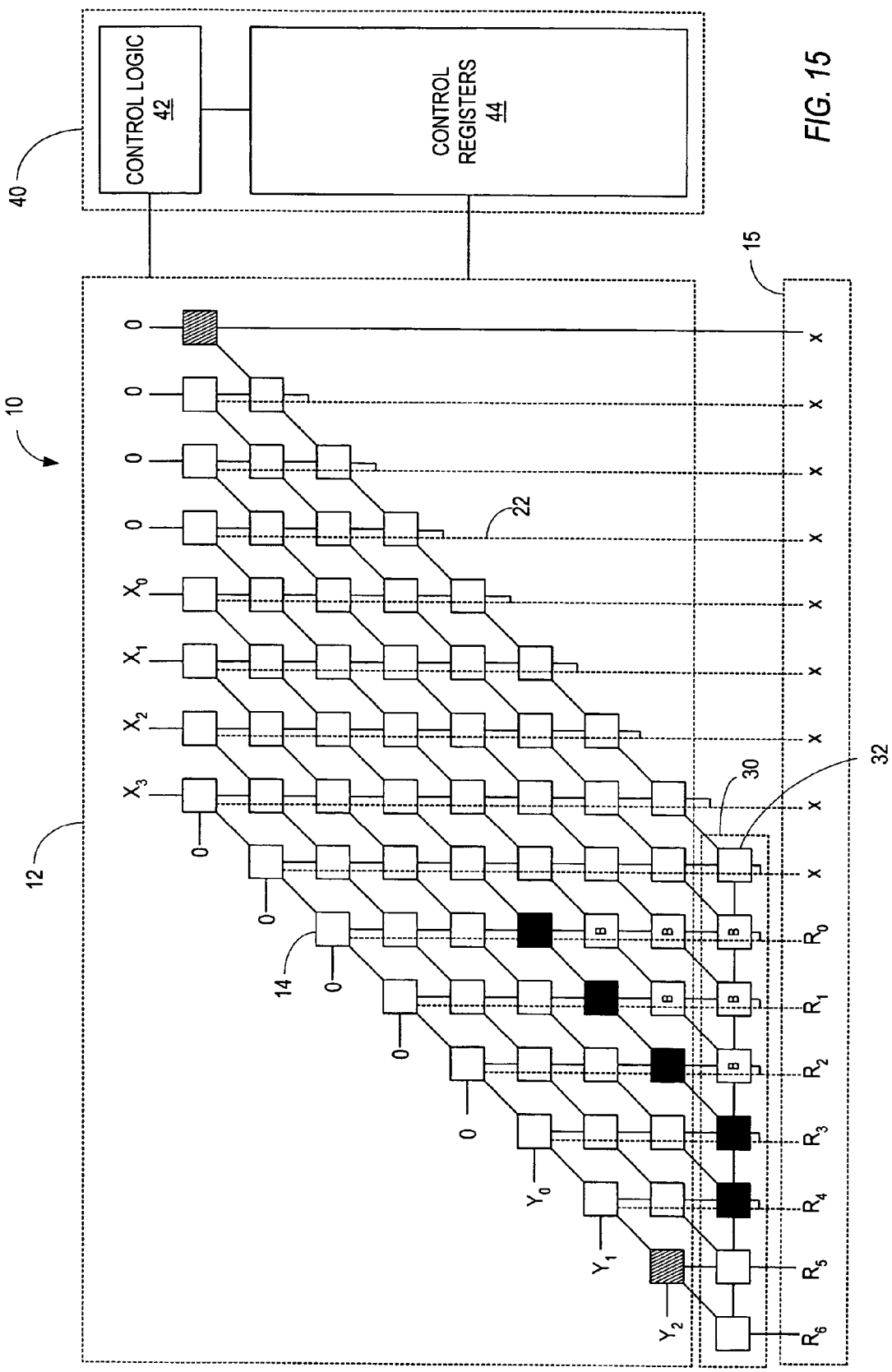
FIG. 15 is a graphical illustration of the fourth embodiment of the array multiplier with bypass lines providing one-bit bypass granularity configured to perform a 4×3 multiplication operation.

As an example, a 4×3 multiplication using the fourth embodiment of the array multiplier 10 is shown in FIG. 15. The non-essential array elements 14 and adder elements 32 for a 4×3 multiplication operation have been marked with letter 'B'. For single bit granularity, the control registers 44 will include a single bit register for each modified adder element 32 as well as each array element for configuring the bypass switches 36.

Fifth Embodiment

Figure 16:
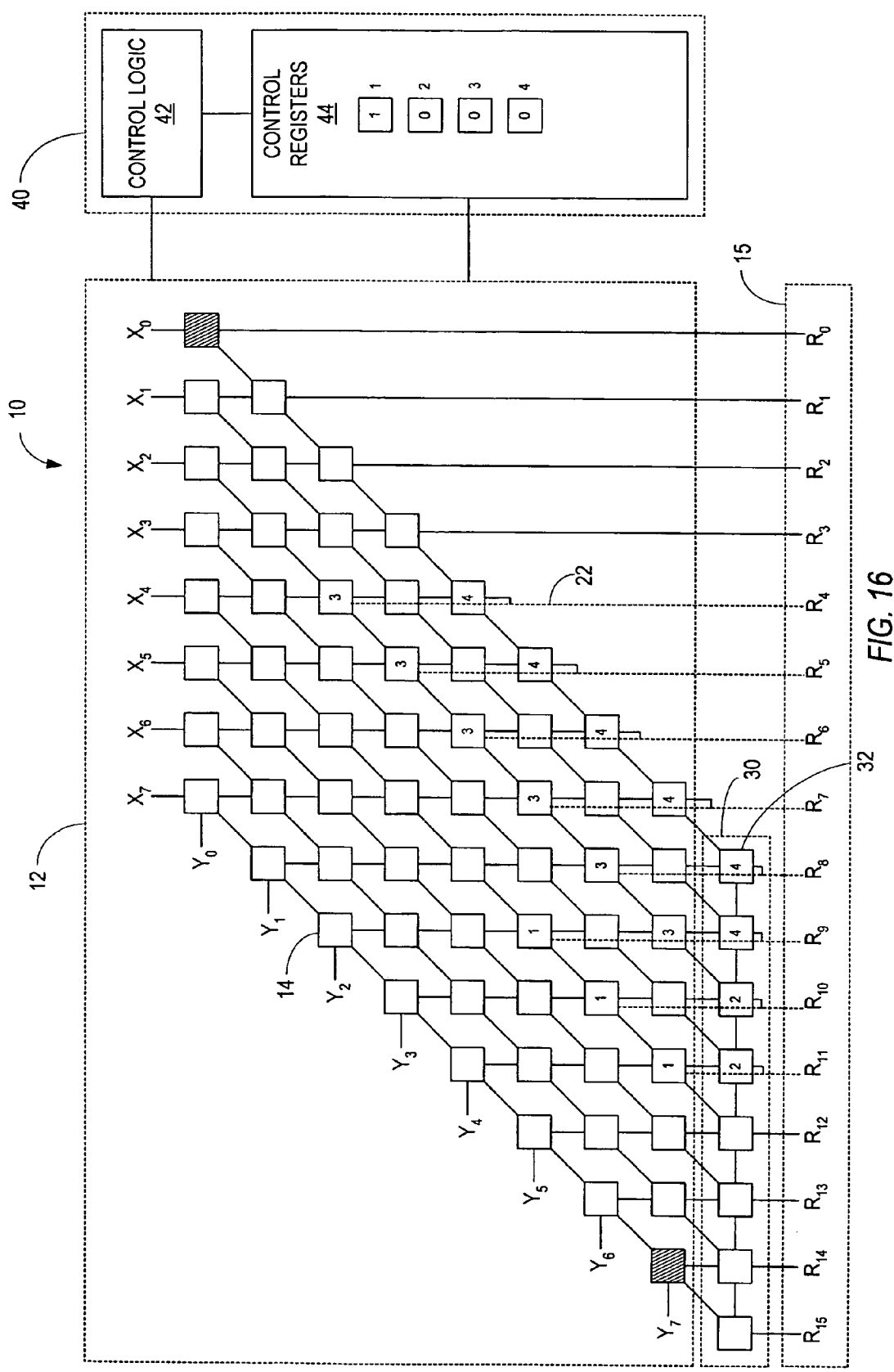
FIG. 16 is a graphical illustration of a fifth embodiment of the array multiplier with bypass lines providing one-bit bypass granularity.

FIG. 16 illustrates a fifth embodiment of the array multiplier with coarse granularity for the multiplicand. This embodiment is the same as the third embodiment except that the bypass lines extend beyond the carry propagate adder 30. The structure of the partial product array 12 and carry propagate adder 30 are the same as the second embodiment with the following differences. In the fifth embodiment shown in FIG. 16, array elements 14 in the last row are as shown in FIG. 6A and the sum outputs for the array elements 14 in the last row are connected to the sum input of respective adder elements in the carry propagate adder 30. The carry propagate adder 30 uses the modified adder elements 32 as shown in FIG. 14 including a full adder 34 and bypass switch 36. When the adder element 32 needs to be bypassed, bypass switch 36 is opened to disconnect the adder element 32 from the bypass line 22. The bypass switch 36 is closed when adder element 32 has to be used for addition.

Figure 17:
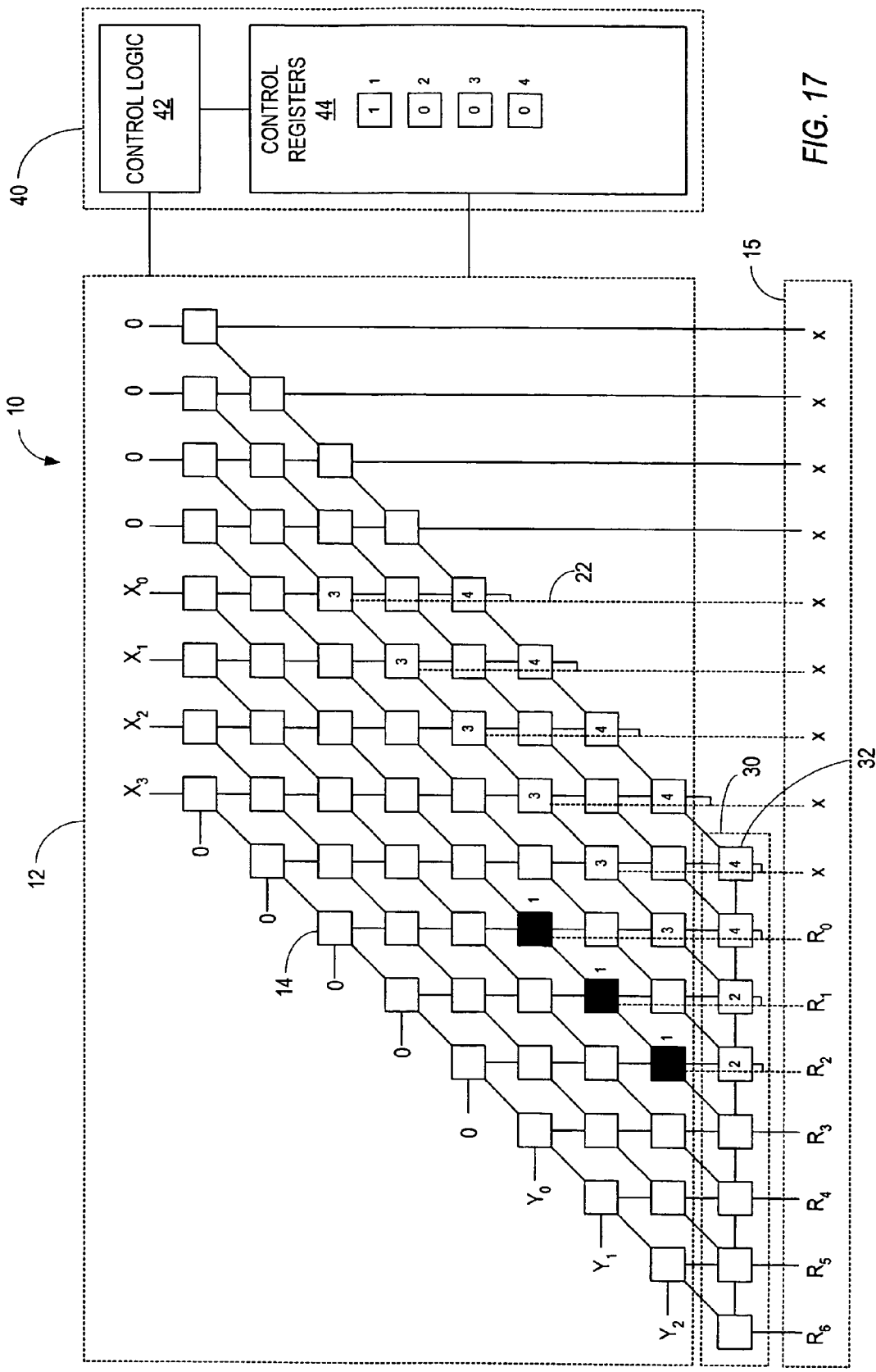
FIG. 17 is a graphical illustration of the fifth embodiment of array multiplier configured to perform a 4×3 multiplication operation.
Figure 18:
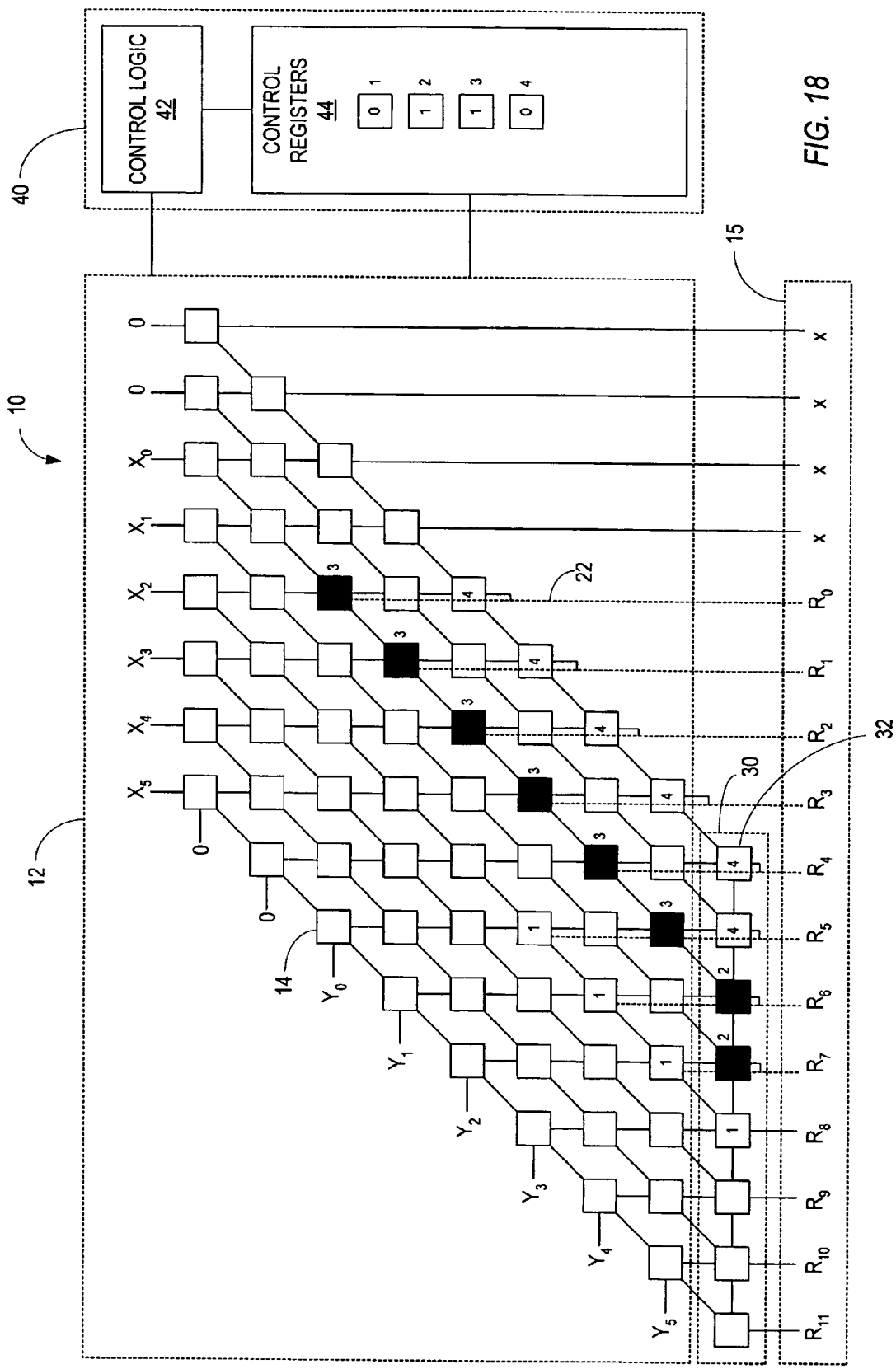
FIG. 18 is a graphical illustration of the fifth embodiment of array multiplier configured to perform a 6×6 multiplication operation.
Figure 19:
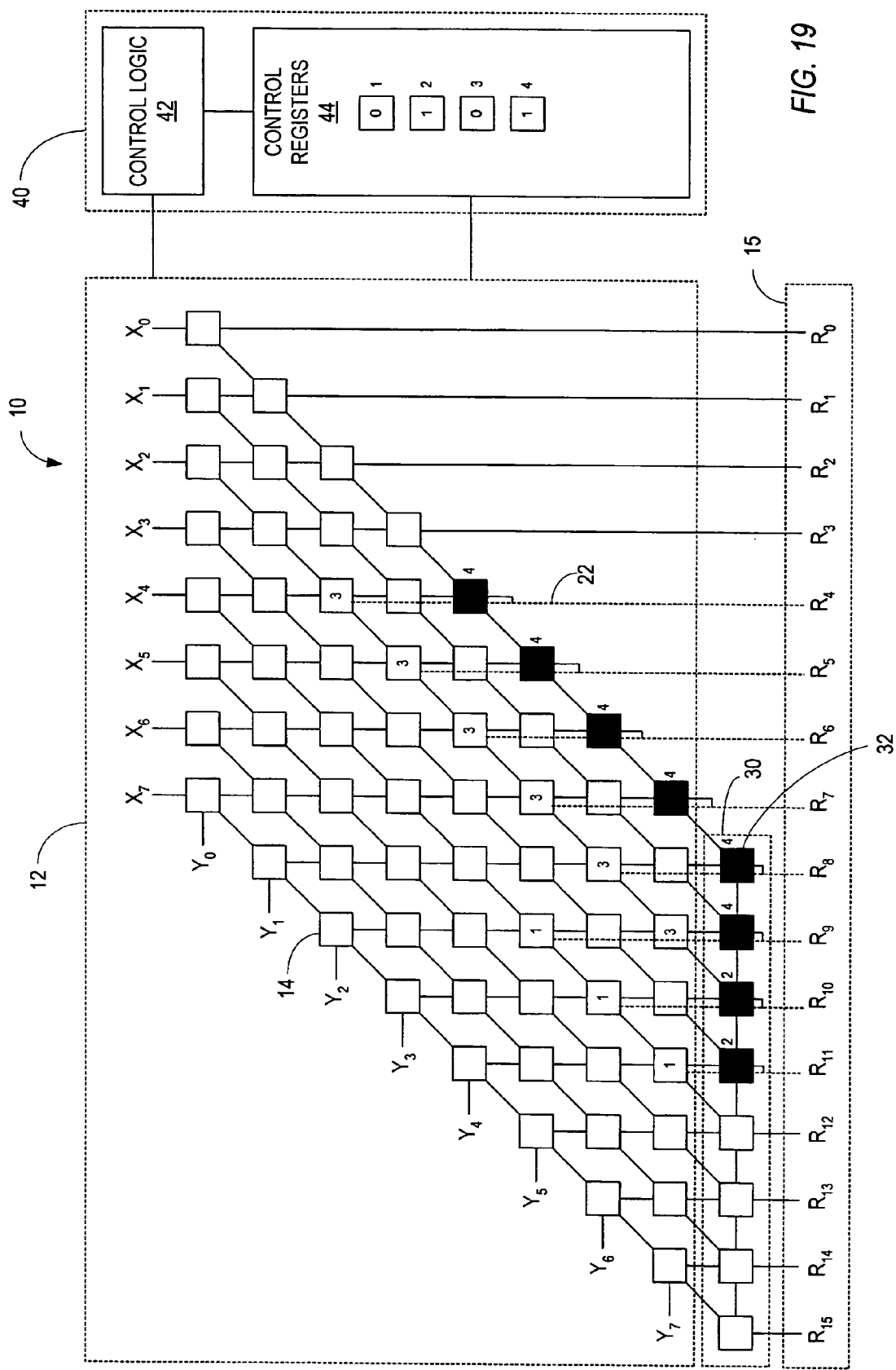
FIG. 19 is a graphical illustration of the fifth embodiment of array multiplier configured to perform a 8×8 multiplication operation.

The fifth embodiment of the array multiplier has three configuration or operating modes—the 4×3 mode, 6×6 mode and 8×8 mode. Only four control registers 44 are needed. Control logic 42 configures the control registers 44 and pads the operands in the three operating modes as shown in FIGS. 17-19. FIG. 17 illustrates the 4×3 mode, FIG. 18 illustrates the 6×6 mode, and FIG. 19 illustrates the 8×8 mode. In FIGS. 17-19 array elements 14 shown in black are connected to the bypass line 22. In general, the control logic 42 selects the operating mode that minimizes the number of array elements 14 being used. For example, to perform multiplication of a 5-bit multiplicand by a 4-bit multiplier, control logic 42 selects the 6×6 operating mode. For the 4×3 and 6×6 modes, the multiplier and the multiplicand have to be shifted toward the MSB and the LSB positions as shown in FIGS. 17 and 18. As previously described, the multiplicand is shifted to align the LSB of the multiplicand with a predetermined column dependent on the bypass granularity. The multiplier is shifted to align the MSB of the multiplier with the MSB row of the partial product array 12.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of multiplying two operands comprising:
 inputting two operands to an array multiplier comprising an array containing N×M array elements and a final carry propagate adder such that at least one operand is displaced towards the most significant row or column of the array to reduce the number of array elements used to compute the product of the operands; and
 multiplying the operands in the array multiplier.

2. The method of claim 1 wherein inputting two operands to an array multiplier comprises inputting the operands to the array multiplier such that the most significant bit of each displaced operand is aligned with the most significant bit of the array.

3. The method of claim 1 wherein inputting two operands to an array multiplier comprises inputting the operands to the array multiplier such that the least significant bit of at least one operand is aligned with a predetermined row or column of the array.

4. The method of claim 1 further comprising padding each displaced operand with one or more zeros in the least significant bit positions to prevent switching of unused array elements.

5. The method of claim 1 further comprising turning off power to unused array elements.

6. The method of claim 1 further comprising reducing latency by fetching the product of the operands from the array multiplier at a time dependent on the bit width of the operands.

7. The method of claim 1 further comprising connecting selected array elements to the final carry propagate adder to bypass unused array elements between the selected array elements and the final carry propagate adder.

8. The method of claim 7 wherein connecting selected array elements to the final carry propagate adder comprises generating a control signal and selectively connecting an output of said selected array element to said final carry propagate adder responsive to said control signal.

9. The method of claim 1 further comprising connecting selected array elements to the output of the array multiplier to bypass the carry propagate adder.

10. The method of claim 9 wherein connecting selected array elements to the output of the array multiplier comprises generating a control signal and selectively connecting an output of said selected array element to respective outputs of the array multiplier responsive to said control signal.

11. An array multiplier comprising:
 an array including a plurality of array elements arranged in rows and columns;
 a final carry propagate adder operatively connected to said array; and
 control logic for inputting two operands to said array such that at least one operand is displaced towards a most significant row or column of said array to reduce the number of array elements used to compute the product of the operands.

12. The array multiplier of claim 11 wherein said control logic inputs the operands to the array multiplier such that the most significant bit of each displaced operand is aligned with a most significant row or column of the array.

13. The array multiplier of claim 11 wherein said control logic inputs the operands to the array multiplier such that the least significant bit of each displaced operand is aligned with a predetermined column of the array.

14. The array multiplier of claim 11 wherein said control logic pads each displaced operand with one or more zeros in the least significant bit positions to prevent switching of unused array elements.

15. The array multiplier of claim 11 wherein said control logic turns off power to unused array elements.

16. The array multiplier of claim 11 further wherein said control logic fetches the product of the operands from the array multiplier at a time dependent on the bit width of said operands.

17. The array multiplier of claim 11 wherein said control logic couples selected array elements to the final carry propagate adder to bypass unused array elements between the selected array elements and the final carry propagate adder.

18. The array multiplier of claim 17 wherein said control logic couples selected array elements to the final carry propagate adder by generating a control signal for the selected array elements, and wherein the selected array elements output a sum to said final carry propagate adder responsive to said control signal.

19. The array multiplier of claim 11 wherein said control logic couples selected array elements to the respective outputs of the array multiplier to bypass the carry propagate adder.

20. The array multiplier of claim 19 wherein said control logic couples selected array elements to the respective outputs of the array multiplier by generating a control signal for the selected array elements, and wherein the selected array elements output a sum directly to the respective outputs of the array multiplier.

* * * * *